(12) United States Patent
Takahashi et al.

(10) Patent No.: US 9,132,610 B2
(45) Date of Patent: Sep. 15, 2015

(54) NI-CONTAINING-SURFACE-TREATED STEEL SHEET FOR CAN AND MANUFACTURING METHOD THEREOF

(75) Inventors: Takehiro Takahashi, Tokyo (JP); Ikuo Kikuchi, Tokyo (JP); Kenichiroh Matsumura, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/009,377

(22) PCT Filed: Apr. 4, 2012

(86) PCT No.: PCT/JP2012/059204
§ 371 (c)(1),
(2), (4) Date: Oct. 2, 2013

(87) PCT Pub. No.: WO2012/137823
PCT Pub. Date: Oct. 11, 2012

(65) Prior Publication Data
US 2014/0017515 A1    Jan. 16, 2014

(30) Foreign Application Priority Data
Apr. 7, 2011    (JP) ................................. 2011-085360

(51) Int. Cl.
*B32B 15/00*    (2006.01)
*B32B 15/01*    (2006.01)
*C25D 5/50*    (2006.01)
(Continued)

(52) U.S. Cl.
CPC ............. *B32B 15/015* (2013.01); *B32B 1/02* (2013.01); *C25D 5/12* (2013.01); *C25D 5/14* (2013.01); *C25D 5/36* (2013.01); *C25D 5/50* (2013.01); *C25D 7/0614* (2013.01); *H01M 2/0292* (2013.01); *H01M 2/065* (2013.01);
(Continued)

(58) Field of Classification Search
None
See application file for complete search history.

(56) References Cited

U.S. PATENT DOCUMENTS 5,476,724 A * 12/1995 Moysan et al. ............... 428/627
5,679,181 A * 10/1997 Ohmura et al. .............. 148/518
(Continued)

FOREIGN PATENT DOCUMENTS

| JP | 1-111896 A | 4/1989 |
|---|---|---|
| JP | 2-85394 A | 3/1990 |

(Continued)

OTHER PUBLICATIONS

International Search Report for International Application No. PCT/JP2012/059204 dated Jul. 10, 2012 with English translation.
(Continued)

*Primary Examiner* — Humera Sheikh
*Assistant Examiner* — Seth Dumbris
(74) *Attorney, Agent, or Firm* — Birch, Stewart, Kolasch & Birch, LLP.

(57) ABSTRACT

A Ni-containing-surface-treated steel sheet for a can, which is formed by stamping, includes a steel sheet having a first surface which becomes an outer surface of the can after the stamping; a Ni containing layer arranged on the first surface of the steel sheet; and a Ni—W alloy plating layer arranged on the Ni containing layer. The Ni containing layer includes a Fe—Ni diffusion alloy layer; a Ni content included in the Ni containing layer is from 5 g/m$^2$ to 89 g/m$^2$; a thickness of the Ni—W alloy plating layer is from 0.02 μm to 2 μm; and a W concentration in the Ni—W alloy plating layer is from 10% to 65% by mass %.

14 Claims, 3 Drawing Sheets

(51) Int. Cl.
  H01M 2/02 (2006.01)
  H01M 2/06 (2006.01)
  C25D 5/14 (2006.01)
  C25D 5/36 (2006.01)
  B32B 1/02 (2006.01)
  C25D 5/12 (2006.01)
  C25D 7/06 (2006.01)

(52) U.S. Cl.
  CPC .. *Y10T428/12778* (2015.01); *Y10T 428/12937* (2015.01)

(56) References Cited

U.S. PATENT DOCUMENTS

| | | | |
|---|---|---|---|
| 6,136,107 A | | 10/2000 | Ohmura et al. |
| 6,165,640 A | * | 12/2000 | Sugikawa ............... 429/166 |
| 6,902,843 B2 | * | 6/2005 | Ishizuka et al. ........... 429/166 |
| 2009/0286103 A1 | * | 11/2009 | Sklar et al. ............... 428/615 |

FOREIGN PATENT DOCUMENTS

| | | | |
|---|---|---|---|
| JP | 6-2104 A | 1/1994 | |
| JP | 6-293978 A | 10/1994 | |
| JP | 9-306439 A | 11/1997 | |
| JP | 2002-50324 A | 2/2002 | |
| JP | 2005-149735 A | 6/2005 | |
| JP | 2006-104574 A | 4/2006 | |
| JP | 2007-035282 * | 2/2007 | .............. H01M 2/02 |
| JP | 2007-51325 A | 3/2007 | |
| JP | 2011-26677 A | 2/2011 | |
| WO | WO 95/11527 A1 | 4/1995 | |
| WO | WO 00/65671 A1 | 11/2000 | |
| WO | WO 2010/112502 A1 | 10/2010 | |

OTHER PUBLICATIONS

Japanese Office Action for Japanese Application No. 2013-508899 dated Aug. 6, 2013 with English translation.

Naidu et al., "Ni—W (Nickel—Tungsten)," Binary Alloy Phase Diagrams, Second Edition, vol. 3, 1990, pp. 2882-2883.

Omi et al., "W-Enrichment of Electroplated Ni—W Alloy Films and Film Properties," Metal Surface Technology, vol. 39, No. 809, 1988, pp. 47-50 (with partial English translation).

* cited by examiner

NI-CONTAINING-SURFACE-TREATED STEEL SHEET FOR CAN AND MANUFACTURING METHOD THEREOF

TECHNICAL FIELD

The present invention relates to a Ni-containing-surface-treated steel sheet for a can which, on a surface which becomes the outer side of the can after stamping the steel sheet, has a Ni containing layer, which has a Fe—Ni diffusion alloy layer, and has a Ni—W alloy plating layer on the Ni containing layer, and to a manufacturing method thereof.

Priority is claimed on Japanese Patent Application No. 2011-085360, filed on Apr. 7, 2011, the contents of which are incorporated herein by reference.

BACKGROUND ART

Plated steel sheets are generally used after stamping. Therefore, as basic performances, it is required that the plating layer is hard to break and not easily peel off even when stamped. In general, a plated surface which becomes the outer surface of a can is easily damaged by stamping. This relates to the fact that, in the draw forming when forming the can, the sliding of the plated surface which becomes the outer surface of the can and a die is generally larger in comparison with the sliding of the plated surface which becomes the inner surface of the can and a punch.

In addition, in a Ni plated steel sheet which does not have a function of sacrificial protection from corrosion with respect to a steel sheet, reducing the exposure of the steel sheet as a substrate of plating even after processing is important in terms of improving the corrosion resistance after the stamping. Therefore, in Ni plated steel sheets, a technique of forming a Fe—Ni diffusion alloy layer on an interface of the steel sheet which is the base material and the Ni plating layer by performing a Ni plating process and then performing heating is known (for example, refer to Patent Document 1).

By forming the Fe—Ni diffusion alloy layer on the interface between the steel sheet and the Ni plating layer, it is possible to ensure high adhesion and, along with this, the Ni plating layer becomes a soft recrystallized Ni layer by annealing, whereby following the deformation of the steel sheet is easier during stamping and, as a result, excellent performances are exhibited such as being able to reduce the exposure of the Fe and also being able to eliminate bad influence of pin holes which are formed during the electroplating.

In addition, in a case where continuous stamping is performed in the industrial production, it is required that the die is not easily damaged as an important performance. In such a case, it is required that the plating surface which becomes the outer surface of the can be difficult to adhere to the die and have a high sliding ability. With respect to this demand, there is known a method where the adhesion to the die is suppressed by annealing a steel sheet where a Ni plating layer is formed, performing plating in a Ni plating bath where a gloss additive is added onto the Ni plating layer, and then forming a hard, glossy Ni plating layer on the surface layer. For example, in Patent Document 2, glossy Ni plating is performed on the uppermost layer of the surface which becomes the outer surface of the can. The glossy Ni plating layer is harder than an annealed recrystallized Ni layer or a matt Ni plating layer and the adhesion to the die during the stamping is reduced in comparison therewith.

In addition, Ni—W alloy plating is known as hard Ni based plating (for example, refer to Patent Document 3, Non-Patent Document 1, and the like). In general, Ni—W alloy plating is precipitated in an amorphous shape and is hard. In addition, Ni—W alloy plating is known to exhibit high hardness even when heated. Furthermore, since the NI—W alloy includes W with a high melting point, an alloy layer is not easily formed by solid phase diffusion. Since the new surface adheres less easily to the die for stamping than Ni even when exposed as long as there is a Ni—W alloy plating layer on the surface layer, it is possible to suppress the adhesion to a plated metal die and it is possible to increase productivity.

PRIOR ART DOCUMENTS

Patent Documents

[Patent Document 1] Japanese Unexamined Patent Application, First Publication No. H6-002104
[Patent Document 2] Japanese Unexamined Patent Application, First Publication No. 2002-50324
[Patent Document 3] Japanese Unexamined Patent Application, First Publication No. H9-306439

Non-Patent Document

[Non-Patent Document 1] Omi, Takashi; Nakamura, Masahiko; Yamamoto, Hisashi; Metal Surface Technology, 39, 809 (1988)

DISCLOSURE OF INVENTION

Problems to be Solved by Invention

Regarding the plated steel sheet of Patent Document 1, since the Ni plating layer on the surface is soft, when stamping is performed, a new surface of Ni is generated in the surface which becomes the outer surface of the can, the surface touches the die and the Ni easily adheres to the die. When the Ni adheres to the die, it becomes necessary to care for as well as replace the die, and the productivity (the continuous stamping property) of the can is decreased.

Regarding the plated steel sheet of Patent Document 2, a glossy Ni plating layer, which is harder than the annealed recrystallized Ni layer or the matt Ni plating layer, is formed on the surface layer. Therefore, in comparison with the plated steel sheet of which the recrystallized Ni layer or the matt Ni plating layer exists in the surface layer, the adhesion to the die during stamping is reduced. However, at present, a further improvement in the adhesion suppressing effect and an accompanying improvement in the continuous stamping property are desired. In addition, the glossy Ni plating layer of Patent Document 2 is softened by heating. Therefore, in the embodiment of Patent Document 2, only a method where matt Ni plating is performed on a steel sheet, heating is performed such that the Fe—Ni diffusion alloy layer is formed between the base material and the matt Ni plating layer, and a glossy Ni plating layer is formed thereafter is shown. That is, it is not possible to adopt a method where a matt Ni plating layer is formed, a glossy Ni plating layer is formed thereon, and the Fe—Ni diffusion alloy layer is formed thereafter. In general, when the plating of multiple layers is performed, if a drying process is added therebetween, there is a need to sufficiently perform pickling and to sufficiently remove the oxide layer to ensure the adhesion property of the interface, which is complicated. Moreover, when the pickling is excessively strong, corrosion may progress from the pin holes of the plating and the yield may be decreased.

Regarding the plated steel sheet of Patent Document 3, an alloy such as Ni—W is plated as a single layer, or an alloy such as Ni—W is plated on an ultra-thin plating layer such as strike plating which is formed and which is defined as "a thin film of electrodeposited metal for promoting the precipitation of a film which is performed in a subsequent process". In addition, Patent Document 3 is characterized in that an alloy plating layer which is formed on the surface which becomes the outer surface of the can is softer than an alloy plating layer which is formed on the surface which becomes the inner surface of the can, and is set such that cracks do not appear in the surface which becomes the outer surface of the can. However, when a soft alloy plating layer where cracks are not easily generated in the surface layer is formed on the surface which becomes the outer surface of the can, there is a high possibility that the plated metal will be adhered to the die during the stamping, whereby the continuous stamping property is inferior. In addition, even when a hard alloy plating layer where adhesion to the die is not easily generated is formed on the surface which becomes the outer surface of the can, cracks appear in the alloy plating layer during the stamping. Due to the generation of the cracks, the steel sheet which is the base material is exposed and the corrosion resistance after the stamping is remarkably decreased. Even when there is a strike plating layer in the lower layer of the alloy plating layer, it is not possible to suppress the propagation of the cracks which appear in the alloy plating layer with the strike plating and the corrosion resistance after stamping is remarkably decreased.

One aspect of the present invention has been made in view of the above-described circumstances and has an object of providing a Ni-containing-surface-treated steel sheet for a can in which adhesion of a plated metal to the die during continuous stamping is not easily generated and the corrosion resistance thereof is high after stamping, and a manufacturing method thereof.

Means for Solving the Problems

As a result of intensive studies, the present inventors found a surface-treated steel sheet which is obtained by performing Ni plating on a surface of a steel sheet which becomes the outer surface of a can, forming a Fe—Ni diffusion alloy layer at an interface between the steel sheet and the Ni plating layer by heating, and then performing hard Ni—W alloy plating on the uppermost surface. By doing so, it is possible to suppress the adhesion of the plated metal to the die, and it is also possible to not only improve the continuous stamping property but to ensure the corrosion resistance after the stamping since the base material is not easily wholly exposed even during stamping.

The gist of the present invention is as follows.
(1) A Ni-containing-surface-treated steel sheet for a can, which is formed by a stamping, according to an aspect of the present invention, includes: a steel sheet having a first surface which becomes an outer surface of the can after the stamping; a Ni containing layer arranged on the first surface of the steel sheet; and a Ni—W alloy plating layer arranged on the Ni containing layer. The Ni containing layer has a Fe—Ni diffusion alloy layer, a Ni content included in the Ni containing layer is 5 g/m² to 89 g/m², a thickness of the Ni—W alloy plating layer is 0.02 μm to 2 μm, and a W concentration in the Ni—W alloy plating layer is 10% to 65% by mass %.
(2) In the Ni-containing-surface-treated steel sheet for a can according to the above-described (1), the Ni containing layer may further have a recrystallized Ni layer, and the recrystallized Ni layer may be arranged between the Fe—Ni diffusion alloy layer and the Ni—W alloy plating layer.
(3) In the Ni-containing-surface-treated steel sheet for a can according to the above-described (1) or (2), the thickness of the Ni—W alloy plating layer may be 0.05 μm to 1 μm, and the W concentration in the Ni—W alloy plating layer may be 15% to 60% by mass %.
(4) In the Ni-containing-surface-treated steel sheet for a can according to any one of the above-described (1) to (3), the W concentration in the Ni—W alloy plating layer may be 31% to 55% by mass %.
(5) In the Ni-containing-surface-treated steel sheet for a can according to any one of the above-described (1) to (4), the Ni content included in the Ni containing layer may be 7 g/m² to 40 g/m².
(6) A can according to another aspect of the present invention is formed by the Ni-containing-surface-treated steel sheet for the can according to any one of the above-described (1) to (5).
(7) A method of manufacturing the Ni-containing-surface-treated steel sheet for the can according to any one of the above-described (1) to (5) according to still another aspect of the present invention includes: a Ni plating process of performing Ni plating on the first surface side of the steel sheet; a Ni—W alloy plating process of performing Ni—W alloy plating on the first surface side of the steel sheet; and a heating process of performing heating of the steel sheet in a temperature range of 600° C. to 950° C. for 5 seconds to 60 minutes after the Ni plating process or after the Ni—W alloy plating process.
(8) In the method of manufacturing the Ni-containing-surface-treated steel sheet for the can according to the above-described (7), the heating process may be performed after the Ni plating process, and the method may further include a film removing process of removing an oxide layer on a surface of the first surface side of the steel sheet after the heating process and before the Ni—W alloy plating process.
(9) In the method of manufacturing the Ni-containing-surface-treated steel sheet for the can according to the above-described (7), the heating process may be performed after the Ni—W alloy plating process, and the first surface side of the steel sheet may be kept so as not to be oxidized between the Ni plating process and the Ni—W alloy plating process.
(10) In the method of manufacturing the Ni-containing-surface-treated steel sheet for a can according to any one of the above-described (7) to (9), the steel sheet which is used in the Ni plating process may be manufactured by a cold rolling, and not annealed after the cold rolling.

Advantageous Effects of Invention

A steel sheet with a Ni containing surface treatment for a can according to the above-described aspects of the present invention has a Ni—W alloy plating layer, which is hard and is suppressed the adhesion to the die, on the uppermost layer of the surface which becomes the outer surface of a can, which is easily damaged by stamping, and has a soft Fe—Ni diffusion alloy layer, which may suppress the propagation of cracks even if the cracks are generated in the Ni—W alloy plating layer during stamping, between the Ni—W alloy plating layer and the steel sheet. As a result, it is possible to provide a Ni-containing-surface-treated steel sheet for a can where adhesion of the plated metal to the die during continuous stamping is not easily generated and which has high corrosion resistance even after stamping.

DESCRIPTION OF EMBODIMENTS

Figure 1:
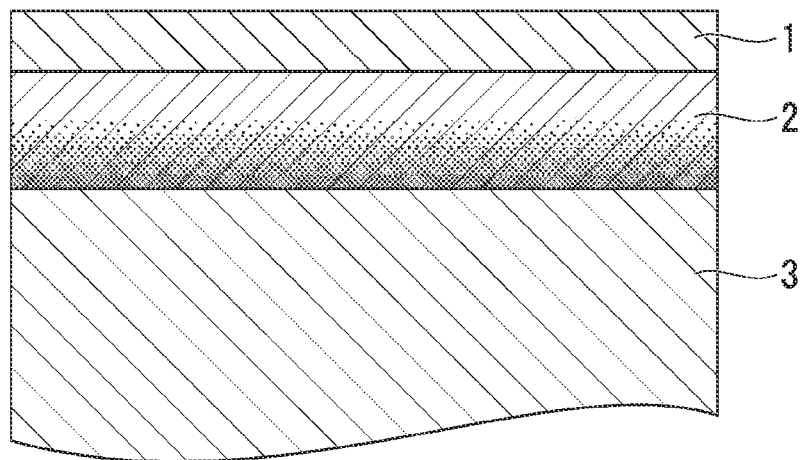
FIG. 1 is a schematic diagram which shows a cross section along the sheet thickness direction of the Ni-containing-surface-treated steel sheet for a can according to one embodiment of the present invention.

With reference to the accompanying drawings, detailed description will be given of preferable embodiments of the present invention. Here, in the drawings, for constituent components which have substantially the same function and configuration, the same reference numerals are attached and overlapping description thereof is omitted. In addition, in the drawings used in the below description, the dimensional ratios and the like of each constituent component are not limited to being the same as in practice and there are cases where portions which are main parts are enlarged and shown for convenience in order to facilitate understanding of the present invention.

Below, description will be given of a Ni-containing-surface-treated steel sheet for a can which has an excellent continuous stamping property and an excellent corrosion resistance after stamping according to an embodiment of the present invention. It is possible for the present invention to be used for any purpose as long as it is a can for an application where a Ni plated steel sheet is generally adopted. For example, a battery can may be mentioned as an example of the application thereof. Specifically, it is possible for the present invention to be used for a can such as an alkali manganese primary battery, a nickel oxyhydroxide primary battery, a nickel manganese primary battery, a nickel hydrogen secondary battery, a nickel cadmium secondary battery, and a lithium ion secondary battery. In particular, a strong effect is exhibited in applications which undergo sliding with strong pressure at the outer surface of the can during the stamping.

In the surface which becomes the inside of the can, known platings may be selected according to the application thereof. For example, as Ni based plating, it is possible to freely select from single layer Ni plating, plating which has a Fe—Ni diffusion alloy layer and a recrystallized Ni layer from the steel sheet which is the base material toward the surface, plating which has a Fe—Ni diffusion alloy layer where the Fe of the base material is diffused to the plating layer surface, or plating which has a Ni—W alloy plating layer.

The important point in the present embodiment is a configuration of the plating of the surface which becomes the outside of the can. First, when the surface of the steel sheet which becomes the outside of the can after stamping (hereafter, set as the "first surface of the steel sheet") has a Ni—W alloy plating layer at the outermost surface layer, the sliding resistance during the stamping is smaller than a case in which a Ni plating layer is included. This is because, since the Ni—W alloy is harder than Ni, the plated metal does not easily adhere to the die even when sliding occurs with a high contact pressure. To express this effect, it is preferable that a W concentration in the Ni—W alloy plating layer is 10 mass % or more and a plating thickness of the Ni—W alloy plating layer is 0.02 μm or more. However, there is a possibility that a Ni—W alloy plating layer where the W concentration is too high may be cohesive failed during processing and may generate metal powder and, additionally, it is difficult to obtain a stable structure during electrocrystallization. Thus, it is sufficient if the W concentration in the Ni—W alloy plating layer is set to 65 mass % or less. If the plating thickness of the Ni—W alloy plating layer is too thick, cracks easily appear in the Ni—W alloy plating layer during stamping and there is a possibility that the cracks will easily reach the steel sheet which is the base material depending on the processing. Thus, it is sufficient if the plating thickness of the Ni—W alloy plating layer is set to 2 μm or less.

In addition, when the hard Ni—W alloy plating layer is directly formed on the first surface of the steel sheet, cracks appear in the Ni—W alloy plating layer due to the processing and reach the steel sheet which is the base material, with the result that the corrosion resistance remarkably deteriorates. FIG. 1 shows a schematic diagram which shows a cross section along the sheet thickness direction of the Ni-containing-surface-treated steel sheet for a can according to the present embodiment. As shown in the diagram, when there is a Ni containing layer which includes a Fe—Ni diffusion alloy layer 2 between a steel sheet 3 which is the base material and a Ni—W alloy plating layer 1, it is possible to suppress the propagation of the cracks which are generated in the Ni—W alloy plating layer 1 using the Ni containing layer which includes the Fe—Ni diffusion alloy layer 2. Since the Fe—Ni diffusion alloy layer 2 of the Ni containing layer does not have a clear interface with the steel sheet 3 which is the base material, the possibility that the Fe—Ni diffusion alloy layer 2 will peel off from the interface during processing such as stamping is extremely low. It is possible to improve the corrosion resistance by having the Fe—Ni diffusion alloy layer 2. However, when the Ni content in the Ni containing layer which has the Fe—Ni diffusion alloy layer 2 is too small, the corrosion resistance improvement effect is insufficient. Thus, it is sufficient if the Ni content in the Ni containing layer which includes the Fe—Ni diffusion alloy layer 2 is 5 g or more per 1 m² on the first surface of the steel sheet 3, that is, 5 g/m² or more. In addition, when the Ni content in the Ni containing layer which has the Fe—Ni diffusion alloy layer 2 is excessively large, the Fe—Ni diffusion alloy layer 2 is exposed from cracks in the Ni—W alloy plating layer 1 which are generated during stamping, and the Fe—Ni diffusion alloy layer 2 may be adhered to the die. Thus, it is sufficient if the Ni content in the Ni containing layer which includes the Fe—Ni diffusion alloy layer 2 is set to 89 g or less per 1 m² on the first surface of the steel sheet 3, that is, 89 g/m² or less.

In addition, even when the Fe of the steel sheet 3 which is the base material is diffused to the Ni—W alloy plating layer 1 through the Ni containing layer, as long as the sum of the W concentration and the Ni concentration in the Ni—W alloy plating layer 1 is 95 mass % or more, the above-described effect is obtained.

Figure 2:
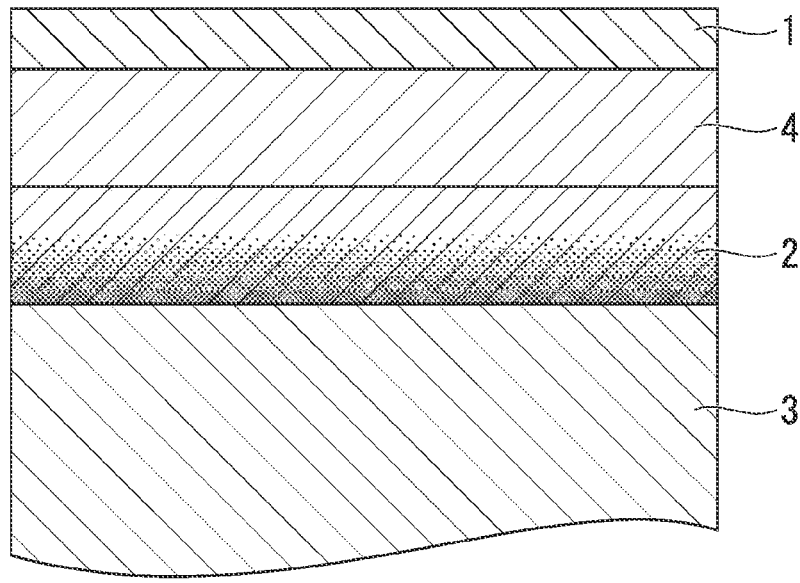
FIG. 2 is a schematic diagram which shows a cross section along the sheet thickness direction of the Ni-containing-surface-treated steel sheet for a can according to another embodiment of the present invention.

As described above, in comparison with a case where the Ni—W alloy plating layer 1 is directly formed on the first surface of the steel sheet 3, it is possible to improve the corrosion resistance after processing as long as the Ni containing layer which includes the Fe—Ni diffusion alloy layer 2 is included between the steel sheet 3 which is the base material and the Ni—W alloy plating layer 1. In a case where a higher corrosion resistance is required, the plating configuration shown in FIG. 2 may be set. FIG. 2 is a schematic diagram which shows a cross section along the sheet thickness direction of the Ni-containing-surface-treated steel sheet for a can according to another embodiment of the present invention. As shown in the diagram, it is sufficient if the Ni containing layer further has a recrystallized Ni layer 4 and the recrystallized Ni layer 4 is arranged between the Ni—W alloy plating layer 1 and the Fe—Ni diffusion alloy layer 2. In such a case, as shown in FIG. 2, the Ni containing layer is configured to include the Fe—Ni diffusion alloy layer 2 and the recrystallized Ni layer 4. In addition, the recrystallized Ni layer 4 is a layer where an as-plated Ni layer which has a dendrite structure is structurally transformed by a heat treatment. Even when cracks appear in the Ni—W alloy plating layer 1 at the time of processing, the soft recrystallized Ni layer 4 having high plastic deformability can follow the deformation of the steel sheet 3 and can further suppress the propagation of the cracks.

In such a case, in order to express such an effect, it is sufficient if the W concentration of the Ni—W alloy plating layer 1 is 10 mass % or more and the plating thickness thereof is 0.02 μm or more. However, there is a possibility that a Ni—W alloy plating layer where the W concentration is too high may be cohesive failed during processing and may generate metal powder. Thus, it is sufficient if the W concentration in the Ni—W alloy plating layer 1 is set to 65 mass % or less. If the plating thickness of the Ni—W alloy plating layer 1 is too thick, cracks easily appear in the Ni—W alloy plating layer 1 during stamping and there is a possibility that the cracks will easily reach the steel sheet 3 which is the base material depending on the processing. Thus, it is sufficient if the plating thickness of the Ni—W alloy plating layer 1 is set to 2 μm or less.

In addition, even if the Ni containing layer has the recrystallized Ni layer 4 in addition to the Fe—Ni diffusion alloy layer 2, when the Ni content in the Ni containing layer which includes the Fe—Ni diffusion alloy layer 2 and the recrystallized Ni layer 4 is too small, the corrosion resistance improvement effect is insufficient. Thus, it is sufficient if the Ni content in the Ni containing layer which includes the Fe—Ni diffusion alloy layer 2 and the recrystallized Ni layer 4 is set to a total of 5 g or more per 1 $m^2$ on the first surface of the steel sheet 3, that is, a total of 5 $g/m^2$ or more. In addition, when the Ni content in the Ni containing layer which has the Fe—Ni diffusion alloy layer 2 and the recrystallized Ni layer 4 is excessively large, the recrystallized Ni layer 4 is exposed from cracks in the Ni—W alloy plating layer 1 which are generated during stamping, and the recrystallized Ni layer 4 may be adhered to the die. Thus, it is sufficient if the Ni content in the Ni containing layer which includes the Fe—Ni diffusion alloy layer 2 and the recrystallized Ni layer 4 is set to a total of 89 g or less per 1 $m^2$ on first surface of the steel sheet 3, that is, a total of 89 $g/m^2$ or less.

Next, further description will be given of the preferable forms of each layer which are in common to the plating configuration where the above-described Ni containing layer does not have the recrystallized Ni layer 4 and the plating configuration where the Ni containing layer has the recrystallized Ni layer 4.

When the W concentration in the Ni—W alloy plating layer 1 is higher, the adhesion suppressing effect during stamping is increased. Thus, when the W concentration in the Ni—W alloy plating layer 1 is 15 mass % or more, the continuous stamping property is increased, which is preferable. In addition, stably plating at a high W concentration is not easy. In order to manufacture a product with a stabilized performance, it is more preferable that the W concentration is set to 60 mass % or less. In addition, since it is possible to obtain a stabilized continuous stamping property when the plating thickness of the Ni—W alloy plating layer 1 is 0.05 μm or more, this is more preferable. On the other hand, considering that the adhesion suppression improvement effect is reduced, that the current efficiency of the Ni—W alloy plating is low, that the W is more expensive than the Ni, and the like, it is more preferable that the plating thickness of the Ni—W alloy plating layer 1 is set to 1 μm or less.

Figure 3:
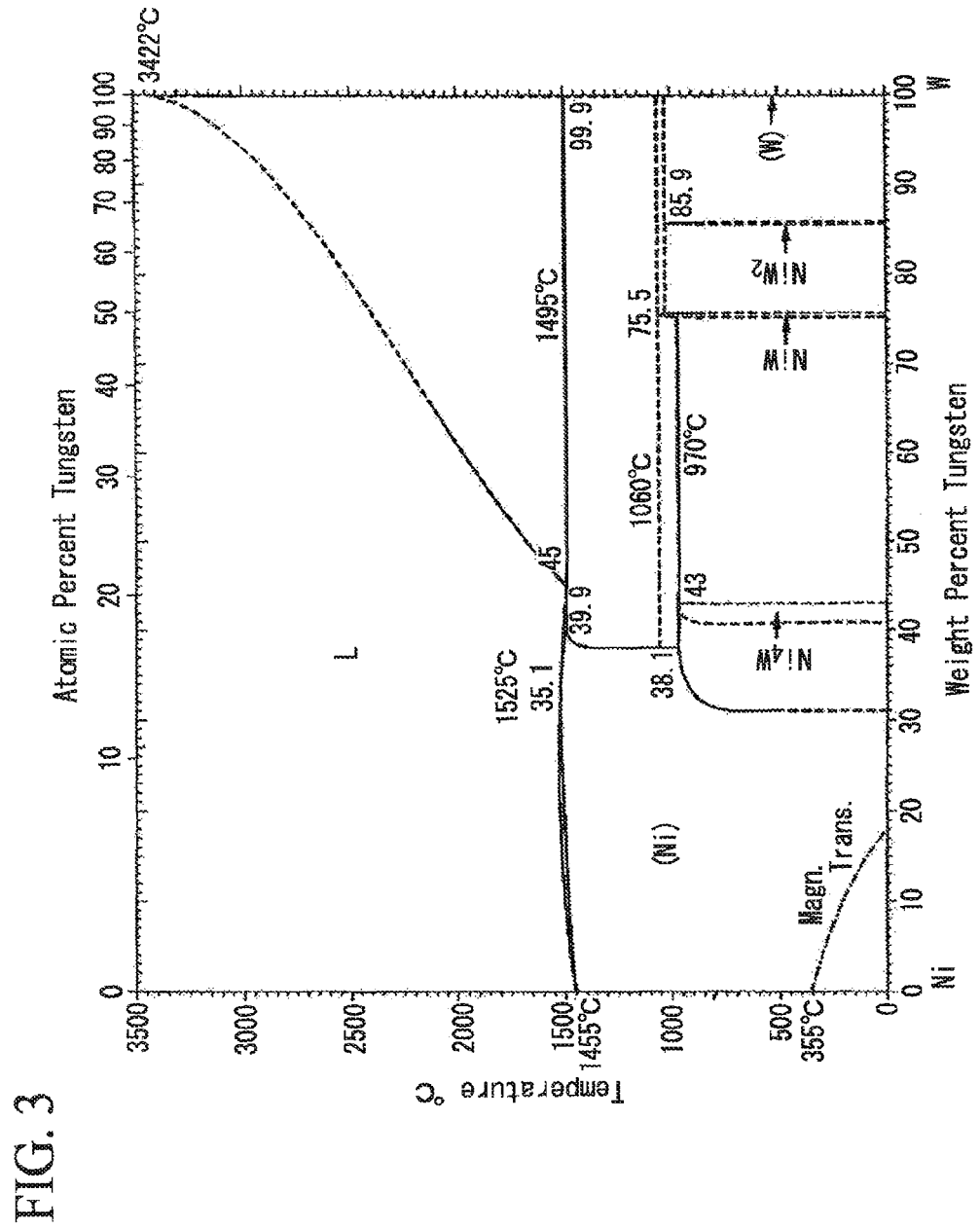
FIG. 3 is a Ni—W binary alloy equilibrium state diagram.

In a case where it is desirable to further suppress the adhesion during the stamping and stably improve the continuous stamping property, it is more preferable when the W concentration in the Ni—W alloy plating layer 1 is 31 mass % or more. The reason for this is not clear; however, it is thought to be related to the Ni—W alloy state. FIG. 3 shows a Ni—W binary alloy equilibrium state diagram (the source is Binary Alloy Phase Diagrams Second Edition Vol. 3 published by ASM International 1990). As shown in the state diagram, it is considered that, in a case where the concentration of the W is 31 mass % or more, a $Ni_4W$ intermetallic compound is formed in the Ni—W alloy plating layer 1, with the result that a higher sliding ability is exhibited. On the other hand, considering that the improvement effect of the continuous stamping property is reduced with a W concentration of a certain level or more, that the W is expensive, and the like, it is more preferable that the W concentration in the Ni—W alloy plating layer 1 is set to 55 mass % or less.

Here, it is possible for the W concentration and the Ni concentration in the Ni—W alloy plating layer 1 to be measured by cross section analysis of a sample which is foil fragment processed according to an FIB (Focused Ion Beam) such that it is possible for a cross section along the sheet thickness direction to be observed, using a TEM (Transmission Electron Microscope) which is capable of element analysis according to EDS (Energy Dispersive X-ray Spectroscopy, i.e. Energy dispersive fluorescent X-ray spectrometer), or an FE-SEM (Field Emission Scanning Electron Microscopy, i.e. cold cathode field emission type scanning battery microscope) which has a STEM (Scanning Transmission Electron Microscope) mode which is capable of element analysis according to EDS. At this time, it is necessary to prepare a calibration curve. First, Ni—W alloys where the structure of Ni and W is changed are plated on steel sheets in a single layer and a plurality of samples where the structure of the Ni and W is changed is prepared. For the cross sections of the plating layers of these samples, quantitative analysis of the Ni and the W is performed using the TEM or the FE-SEM, which has an STEM mode, which is capable of element analysis using EDS. In addition, the plating layers of these samples are dissolved in acid and quantitative analysis of the Ni and the W is performed using ICP-AES (Inductively Coupled Plasma-Atomic Emission Spectrometry) or ICP-MS (Inductively Coupled Plasma Mass Spectrometry). The quantitative analysis result of the Ni and the W according to the EDS which is associated with the TEM or the FE-SEM and the quantitative analysis result of the Ni and the W according to the ICP-AES or the ICP-MS are compared, whereby a calibration curve which is the relationship between the detection intensity and the Ni and W concentrations is calculated using the EDS. For example, for the TEM which is capable of element analysis using EDS, there is a combination of the FE-TEM: TEM 2100F (accelerating voltage 200 kV), manufactured by Nippon Electronics Co., Ltd., and the EDS: JED-2300T, manufactured by Nippon Electronics Co., Ltd., with a probe diameter of approximately 2 nm, or the like.

As the Ni content in the Ni containing layer becomes higher, the corrosion resistance is increased. Thus, in a case where even higher corrosion resistance is necessary, for example, in a case where corrosion resistance after stamping is performed by severe plastic deformation or long-term corrosion resistance after stamping is required, the total Ni content which is included in the Ni containing layer which has the Fe—Ni diffusion alloy layer 2 or the recrystallized Ni layer 4 is more preferably 7 g or more per 1 $m^2$ on the first surface of the steel sheet 3, that is, 7 $g/m^2$ or more. The upper limit of the total Ni content which is included in the Ni containing layer which has the Fe—Ni diffusion alloy layer 2 or the recrystallized Ni layer 4 is not particularly limited from the point of view of corrosion resistance. However, considering that the improvement effect of the corrosion resistance is reduced with a Ni content of a certain level or more, that Ni is cheaper than W but more expensive than Fe, and the like, the upper limit of the above-described Ni content is more preferably 40 g or less per 1 $m^2$ on the first surface of the steel sheet 3, that is, 40 $g/m^2$ or less.

It is possible for the thickness of the Ni—W alloy plating layer 1, the presence or absence of the Fe—Ni diffusion alloy layer 2 and the recrystallized Ni layer 4 in the Ni containing layer, or the like which are shown here to be confirmed by line analysis of the cross section along the sheet thickness direction using the TEM which is capable of element analysis using EDS or the FE-SEM which has an STEM mode which is capable of element analysis using EDS. Here, by mass %, a portion where the W is included as 10% to 65% and 90% or more of the metal elements of the remainder are Ni is defined as the Ni—W alloy plating layer 1, a portion where the Fe is included as 5% or more and 90% or more of the metal elements of the remainder is Ni is defined as the Fe—Ni diffusion alloy layer 2 of the Ni containing layer, and a portion where the Fe is included as less than 5% and 90% or more of the metal elements of the remainder are Ni is defined as the recrystallized Ni layer 4 of the Ni containing layer. It is possible for the measurement of the plating thicknesses to be performed by performing quantitative analysis of a sample which is foil fragment processed by FIB such that it is possible for a cross section along the sheet thickness direction to be observed, by using a TEM which is capable of element analysis using EDS, or an FE-SEM which has a STEM mode which is capable of element analysis by EDS, determining regions where each of the plating layers defined in the above description is satisfied, and then measuring the thicknesses of the regions along the sheet thickness direction.

It is possible for the Ni content in the Ni containing layer which has the Fe—Ni diffusion alloy layer 2 or the recrystallized Ni layer 4 to be determined by the following methods. The whole of the plating layer of a predetermined area is dissolved in acid and quantitative analysis of the total Ni content and the total W content which are included in the plating layer for each predetermined area is performed using ICP. The Ni content for each predetermined area which is included in the Ni—W alloy plating layer 1 is calculated from the total W content for each predetermined area which is quantified by ICP and the structure and thickness of the Ni—W alloy plating layer 1 which are measured by cross sectional analysis according to EDS. By taking the Ni content which is included in the Ni—W alloy plating layer 1 from the total Ni content in the above-described plating layer, it is possible to quantify the Ni content in the Ni containing layer which has the Fe—Ni diffusion alloy layer 2 or the recrystallized Ni layer 4. Here, the density of the Ni—W alloy plating layer 1 is calculated as approximately Ni %×the density of the Ni+W %×the density of the W by mass %.

Figure 4:
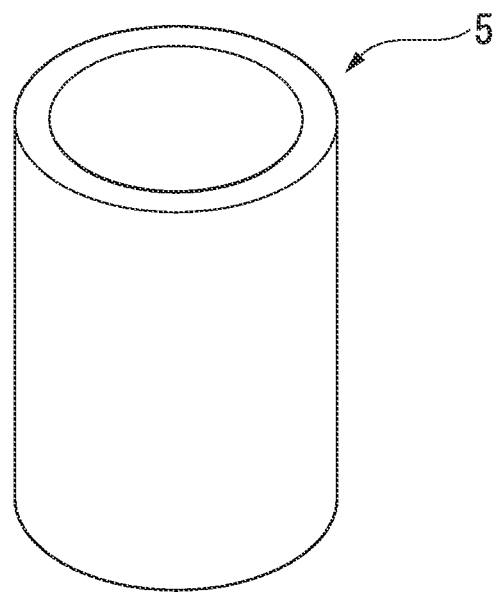
FIG. 4 is a can according to one embodiment of the present invention.

In addition, the can according to one embodiment of the present invention is preferably formed by the above-described Ni-containing-surface-treated steel sheet for a can. FIG. 4 shows a can according to one embodiment of the present invention. A can 5 which is formed by the above-described Ni-containing-surface-treated steel sheet for a can has suppressed adhesion to the die at the time of stamping, has a high corrosion resistance even after stamping, and therefore, is preferable.

The Ni-containing-surface-treated steel sheet for a can of the above-described aspect of the present invention which is described above is summarized below.

(1) A Ni-containing-surface-treated steel sheet for a can of the above-described aspect, which is formed by a stamping, includes the steel sheet 3 having a first surface which becomes an outer surface of the can after the stamping; a Ni containing layer which has a Fe—Ni diffusion alloy layer 2 which is arranged on the first surface of the steel sheet 3; and a Ni—W alloy plating layer 1 which is arranged on the Ni containing layer, where the Ni content included in the above-described Ni containing layer which has the Fe—Ni diffusion alloy layer 2 is 5 g/m$^2$ to 89 g/m$^2$, a thickness of the Ni—W alloy plating layer 1 is 0.02 μm to 2 μm, and a W concentration in the Ni—W alloy plating layer 1 is 10% to 65% by mass %.

(2) Here, it is preferable that the above-described Ni containing layer further has the recrystallized Ni layer 4, and that the recrystallized Ni layer 4 is arranged between the Fe—Ni diffusion alloy layer 2 and the Ni—W alloy plating layer 1.

(3) Here, it is preferable that the thickness of the Ni—W alloy plating layer 1 is 0.05 μm to 1 μm, and the W concentration in the Ni—W alloy plating layer 1 is 15% to 60% by mass %.

(4) Here, it is preferable that the W concentration in the Ni—W alloy plating layer 1 is 31% to 55% by mass %.

(5) Here, it is preferable that the Ni content included in the Ni containing layer is 7 g/m$^2$ to 40 g/m$^2$.

(6) Here, a can of the above-described aspect is formed by the Ni-containing-surface-treated steel sheet for the can according to any one of the above-described (1) to (5).

Next, description will be given of method of manufacturing a Ni-containing-surface-treated steel sheet for a can which has an excellent continuous stamping property and an excellent corrosion resistance after stamping according to an embodiment of the present invention.

It is possible for the above-described Ni-containing-surface-treated steel sheet for a can which has an excellent continuous stamping property and corrosion resistance after stamping to be manufactured by a Ni plating process of performing Ni plating on the first surface side of the steel sheet 3 which becomes an outside of the can after stamping; a Ni—W alloy plating process of performing Ni—W alloy plating on the first surface side of the steel sheet 3; and a heating process of performing heating of the steel sheet 3 in a temperature range of 600° C. to 950° C. for 5 seconds to 60 minutes after the Ni plating process or after the Ni—W alloy plating process. For the surface which becomes an inside of the can after stamping, it is sufficient if the necessary plating is performed according to the application.

An Ni layer which is formed by the Ni plating process and which does not undergo a process of recrystallization thereafter is referred to as an as-plated Ni plating layer hereinafter. For forming of the Ni containing layer which has the Fe—Ni diffusion alloy layer 2 or the recrystallized Ni layer 4 by interdiffusing the Fe of the steel sheet 3 which is the base material and the Ni of the as-plated Ni plating layer, it is sufficient if the above-described heating process is performed after the Ni plating process and a film removing process of removing an oxide layer on the surface of the above-described first surface side of the above-described steel sheet 3 is further performed after the heating process and before the Ni—W alloy plating process. That is, it is sufficient if the manufacturing is performed in the order of the Ni plating process, the heating process, the film removing process, and then, the Ni—W alloy plating process.

Alternatively, for forming of the Ni containing layer which has the Fe—Ni diffusion alloy layer 2 or the recrystallized Ni layer 4 by interdiffusing the Fe of the steel sheet 3 which is the base material and the Ni of the as-plated Ni plating layer, it is sufficient if the above-described heating process is performed after the Ni—W alloy plating process. That is, it is sufficient if the manufacturing is performed in the order of the Ni plating process, the Ni—W alloy plating process, and then, the heating process. Then, it is preferable that the first surface side of the steel sheet 3 is kept so as not to be oxidized between the above-described Ni plating process and the above-described Ni—W alloy plating process. This process order is preferable since the film removing process of removing the surface oxide layer which is formed in the heating process is not necessary before the Ni—W alloy plating process. In addition, it is preferable that the first surface side of the steel sheet 3 is kept so as not to be oxidized between the above-described Ni plating process and the above-described Ni—W alloy plating process since it is possible to obtain a high adhesion property between the Ni—W alloy plating layer 1 and the lower layer thereof. In order to set the first surface side of the steel sheet 3 so as not to be oxidized between the above-described Ni plating process and the above-described Ni—W alloy plating process, it is sufficient if the steel sheet 3 is held so as not to be dried between the above-described Ni plating process and the above-described Ni—W alloy plating process. For example, in a case of electrolytic plating, it is sufficient if the steel sheet 3 is washed with water after the Ni plating process and before the surface of the steel sheet 3 is dried, and then the steel sheet 3 is immersed in a plating solution of the Ni—W alloy plating process and undergoes electrolytic plating before the washing water is dried. In addition, in a case where the heating process is performed after the Ni—W alloy plating process, the W which is included in the Ni—W alloy plating layer 1 and which has a high melting point is hardly diffused in the plating layer; however, the Ni which is included in the Ni—W alloy plating layer 1 and the Ni and the Fe which are included in the lower layer thereof are able to be interdiffused. Thus, in comparison with a case where the heating process is performed before the Ni—W alloy plating process, it is preferable since the adhesion property of the Ni—W alloy plating layer 1 and the lower layer thereof is improved.

Below, each of the above-described process will be described in detail.

In the Ni plating process, in both of the surface which becomes the inside of the can and the surface (the first surface) which becomes the outside after stamping, it is possible to use a plating bath which is generally known. For example, in a case of electroplating, it is possible to use a watt bath, a borofluoride bath, a sulfamic acid bath, a simple nickel sulfate bath, or a nickel chloride bath. In addition, in a case where it is desirable to perform the plating of the Ni plating in a smooth state, plating may be performed using a bath where known gloss additives are added. As the gloss additives, 1,4-butynediol, formaldehyde, and coumarin propargyl alcohol, as well as commercially available secondary gloss additives (smoothing agents) are preferable. When forming the Ni containing layer having the Fe—Ni diffusion alloy layer 2 or the recrystallized Ni layer 4, saccharin, sulfonic acid-based compounds, or commercially available primary gloss additives (atomization agents) may be used alone or in combination with secondary gloss additives, as long as the types and concentrations are such that there is no concern that the plating layer may become brittle. Here, as pre-processing of the Ni plating process, it is preferable to perform cathode electrolysis in sulfuric acid or to perform alkaline degreasing. For example, regarding the cathode electrolysis in sulfuric acid, it is sufficient if the cathode electrolysis is performed for 5 seconds at a current density of 5 A/dm$^2$ in the sulfuric acid at 40° C. at 100 g/L. Regarding the alkaline degreasing, it is sufficient if the steel sheet 3 is immersed in a diluted liquid of a treatment liquid which includes an alkali salt and a surfactant.

Then, in the Ni plating process, Ni plating is performed to the first surface of the steel sheet 3 which becomes the outer surface of the can after stamping such that the Ni content is 5 g to 89 g per 1 m$^2$, that is, 5 g/m$^2$ to 89 g/m$^2$. Preferably, Ni plating is performed to the first surface of the steel sheet 3 which becomes the outer surface of the can after stamping such that the Ni content is 7 g to 40 g per 1 m$^2$, that is, 7 g/m$^2$ to 40 g/m$^2$.

The above-described steel sheet 3 which is used as the base material in the above-described Ni plating process is not particularly limited. As the steel sheet 3, it is sufficient if a soft steel sheet with high workability, a low carbon aluminum killed steel, an ultra-low carbon steel (sulc: Super Ultra-Low Carbon Steel), or the like is used. The sheet thickness is normally 0.1 mm to 1 mm. However, depending on the application and processing, it is possible to use high-tensile steel such as high-Si steel, or the like.

Here, it is preferable that the above-described steel sheet 3 which is used in the above-described Ni plating process is manufactured by cold rolling and is not annealed after the cold rolling. Annealed material after the cold rolling may be used as the steel sheet 3 which is the base material; however, when non-annealed material is used, it is preferable that the annealing of the steel sheet 3 which is the base material is performed at the same time as forming the Ni containing layer which has the Fe—Ni diffusion alloy layer 2 or the recrystallized Ni layer 4 in the above-described heating process.

In the Ni—W alloy plating process, it is possible to use a plating bath which is generally known. For example, in the case of electroplating, it is possible to use a bath containing tungstate ions, nickel ions, and complexing agents thereof. The tungstate ions may be added as salts having high water solubility such as sodium tungstate, potassium tungstate, ammonium tungstate, or the like. As the nickel ions, it is possible to use nickel sulfate, nickel chloride or nickel carbonate as long as dissolution of the nickel carbonate is possible according to the order of the formulation. As the complexing agent, citrates or salts thereof are often added; however, it is also possible to use other complexing agents such as pyrophoric acid and salts thereof, 1-hydroxy-ethane-1,1-bisphosphonate or the like. As the citrate salts, it is possible to use trisodium citrate, disodium hydrogen citrate, sodium dihydrogen citrate, tripotassium citrate, dipotassium hydrogen citrate, potassium dihydrogen citrate, trilithium citrate, dilithium hydrogen citrate, lithium dihydrogen citrate, triammonium citrate, diammonium hydrogen citrate, ammonium dihydrogen citrate, or the like. In addition, it is also said that there is an effect of increasing the current efficiency in the ammonium ions, and ammonium salts may also be used or ammonia may be added separately. In addition, other ions may also be added as necessary in a case such as where it is desirable to increase the solubility of the metal from the anode. For example, chloride ions may be added as hydrochloric acid as necessary, sulfate ions may be added as sulfuric acid as necessary, sodium ions may be added as sodium hydroxide as necessary, potassium ions may be added as potassium hydroxide as necessary, and lithium ions may be added as lithium hydroxide as necessary. Regarding the adding amount of the complexing agent, it is sufficient if an amount which is necessary for the complexing of the tungstate ions and the nickel ions is added. For example, in a case which the citrate or the citrate salt is added as a complexing agent, it is sufficient if the adding is performed such that the citrate or the citrate salt is equivalent to the totals of the tungstate ions and nickel ions in molar concentration. Plating can be proceeded even when the complexing agent is slightly less than the above-described amounts; however, since there is a possibility that the complexing agent may be dissolved at the anode during the plating, it is preferable that the complexing agent is added in an amount slightly greater than the above-described amount. Here, in a case such as where the steel sheet 3 is wound into a coil and the surface of the steel sheet 3 is dried before the Ni—W alloy plating process, it is preferable to perform cathode electrolysis in sulfuric acid or alkaline degreasing as the pre-processing of Ni—W alloy plating process. For example, regarding the cathode electrolysis in sulfuric acid, it is sufficient if the cathode electrolysis is performed for 5 seconds at a current density of 5 A/dm$^2$ in the sulfuric acid at 40° C. at 100 g/L. Regarding the alkaline degreasing, it is sufficient if the steel sheet 3 is immersed in a diluted liquid of a treatment liquid which includes an alkali salt and a surfactant.

Then, in the Ni—W alloy plating process, Ni—W alloy plating is performed such that the thickness of the Ni—W alloy plating layer 1 becomes from 0.02 μm to 2 μm in the outermost surface layer of the first surface side of the steel sheet 3 which becomes the outer side of the can after stamping and the W concentration in the Ni—W alloy plating layer 1 is from 10 mass % to 65 mass %. The W in the Ni—W alloy plating layer 1 which is formed on the outermost surface layer of the first surface side of the steel sheet 3 is hardly diffused even when the steel sheet 3 is heated after the Ni—W alloy plating process because the W has a high melting point. Thus, the W concentration and plating thickness in the Ni—W alloy plating layer 1 hardly changes even a heating process for forming the Ni containing layer which includes the Fe—Ni diffusion alloy layer 2 or the recrystallized Ni layer 4 is performed after the Ni—W alloy plating process which forms the Ni—W alloy plating layer 1. That is, in a case where it is desirable to form a Ni—W alloy plating layer 1 which includes 10 mass % to 65 mass % of W in the outermost surface layer of the first surface side of the steel sheet 3 and which has a thickness of 0.02 μm to 2 μm, it is sufficient if the Ni—W alloy plating is performed to the outermost surface layer of the first surface side of the steel sheet 3 with the W concentration being 10 mass % to 65 mass % and with the thickness being 0.02 μm to 2 μm in either case the Ni—W alloy plating process is before or after the heating process.

Preferably, in the Ni—W alloy plating process, stamping Ni—W alloy plating is performed on the outermost surface layer of the first surface side of the steel sheet 3 which becomes the outer side of the can after stamping such that the thickness of the Ni—W alloy plating layer 1 becomes 0.05 μm to 1 μm and the W concentration in the Ni—W alloy plating layer 1 becomes 15 mass % to 60 mass %. More preferably, Ni—W alloy plating is performed on the outermost surface layer of the first surface side of the steel sheet 3 which becomes the outer side of the can after stamping such that the thickness of the Ni—W alloy plating layer 1 becomes 0.05 μm to 1 μm and the W concentration in the Ni—W alloy plating layer 1 becomes 31 mass % to 55 mass %.

In the heating process, the steel sheet 3 after the Ni plating process or the Ni—W alloy plating process is heated in a temperature range of 600° C. to 950° C. for 5 seconds to 60 minutes. According to this heating process, the Ni containing layer, which has the Fe—Ni diffusion alloy layer 2 or the recrystallized Ni layer 4, is formed. The forming of the Ni containing layer which has the Fe—Ni diffusion alloy layer 2 or the recrystallized Ni layer 4 is influenced by components of the steel sheet 3 which is the base material; however the heating temperature of 600° C. to less than 700° C. and the keeping time of 5 seconds or more is sufficient for forming of the Ni containing layer which has the Fe—Ni diffusion alloy layer 2 or the recrystallized Ni layer 4. As long as the heating temperature is 700° C. to 950° C., the Ni containing layer which has the Fe—Ni diffusion alloy layer 2 or the recrystallized Ni layer 4 is formed, even if the keeping time is 0 seconds.

In the heating in the heating process, the Fe of the steel sheet 3 which is the base material and the Ni of the as-plated Ni plating layer which is formed in the Ni plating process are interdiffused and the Fe—Ni diffusion alloy layer 2 is formed. Then, the as-plated Ni layer is modified to the recrystallized Ni layer 4 in a region which is not reached by the diffusion of the Fe of the steel sheet 3 in the as-plated Ni plating layer. Along with the progress of the above-described interdiffusion in the heating process, the growth of the Fe—Ni diffusion alloy layer 2 proceeds in the Ni containing layer and the recrystallized Ni layer 4 is corroded by the growth of the Fe—Ni diffusion alloy layer 2. That is, in a case where it is desired to further increase the thickness of the Fe—Ni diffusion alloy layer 2 in the Ni containing layer, it is sufficient if the heating temperature is increased or the keeping time is lengthened within the above-described conditions. Furthermore, when further increasing the thickness of the Fe—Ni diffusion alloy layer 2 in the Ni containing layer such that the recrystallized Ni layer 4 does not remain in the Ni containing layer, it is sufficient if the heating temperature is further increased or the keeping time is further lengthened within the above-described conditions. Since the progress of the above-described interdiffusion in the heating process is influenced by the components of the steel sheet 3 which is the base material, it is sufficient if suitable conditions are selected according to the components of the steel sheet 3 to control the thickness of the Fe—Ni diffusion alloy layer 2 in the Ni containing layer. Here, when heating is performed to over 950° C. in the heating process, the surface oxide layer which is formed reaches an unacceptable level. In addition, even when the heating is performed for over 60 minutes in the heating process, the above-described effect is saturated. Here, the heating in the heating process is preferably performed in an $H_2$—$N_2$ atmosphere. For example, a 2% $H_2$—$N_2$ atmosphere is preferred.

In the film removing process which is necessary in a case where the heating process is performed before the Ni—W alloy plating process, the method for removing the surface oxide layer is not particularly limited. It is sufficient if a known method for removing the surface oxide layer is adopted. For example, it is sufficient if removal of the surface oxide layer by surface grinding or removal of the surface oxide layer by pickling is performed.

The method of manufacturing the Ni-containing-surface-treated steel sheet for a can of the above-described aspect of the present invention which is described above is summarized below.

(7) A method of manufacturing the above-described Ni-containing-surface-treated steel sheet for the can according to one aspect of the present invention has a Ni plating process of performing Ni plating on the first surface side of the steel sheet 3; a Ni—W alloy plating process of performing Ni—W alloy plating on the first surface side of the steel sheet 3; and a heating process of performing heating of the steel sheet 3 in a temperature range of 600° C. to 950° C. for 5 seconds to 60 minutes after the Ni plating process or after the Ni—W alloy plating process.

(8) Then, the method where the heating process is performed after the Ni plating process may further have a film removing process of removing an oxide layer on a surface of the first surface side of the steel sheet 3 after the heating process and before the Ni—W alloy plating process.

(9) Alternatively, the method where the heating process is performed after the Ni—W alloy plating process may keep the first surface side of the steel sheet so as not to be oxidized between the Ni plating process and the Ni—W alloy plating process.

(10) Then, the steel sheet 3 which is used in the Ni plating process is preferably manufactured by a cold rolling, and not annealed after the cold rolling.

(11) Then, in the Ni plating process, the Ni plating is performed by electroplating such that the Ni content on the first surface side of the steel sheet 3 becomes 5 $g/m^2$ to 89 $g/m^2$ using at least one plating bath among a watt bath, a borofluoride bath, a sulfamic acid bath, a nickel sulfate bath, or a nickel chloride bath; and, in the Ni—W alloy plating process, Ni—W alloy plating is performed by electroplating such that the W concentration is 10 mass % to 65 mass % and the thickness thereof is 0.02 μm to 2 μm using a plating bath where tungstate ions, nickel ions, and complexing agents thereof are included.

(12) Then, it is preferable that, in the Ni—W alloy plating process, the Ni—W alloy plating is performed by electroplating such that the W concentration is 15 mass % to 60 mass % and the thickness thereof is 0.05 μm to 1 μm.

(13) Then, it is preferable that, in the Ni—W alloy plating process, the Ni—W alloy plating is performed by electroplating such that the W concentration is 31 mass % to 55 mass % and the thickness thereof is 0.05 µm to 1 µm.

(14) Then, it is preferable that, in the Ni plating process, the Ni plating is performed by electroplating such that the Ni content is 7 g/m² to 40 g/m².

EXAMPLE 1

More specific description will be given of the effects of one aspect of the present invention according to the Example; however, the conditions of the Example are one example of conditions which are adopted in order to confirm the operability and effects of the present invention and the present invention is not limited to this example of conditions. As long as the object of the present invention is achieved, the present invention is able to adopt various conditions without departing from the gist of the present invention.

(1) Base Material Steel Sheet

A cold-rolled steel sheet of low carbon aluminum killed steel and Nb—Ti-sulc steel whose components are shown in Table 1 was used as steel sheet which is the base material for plating. The sheet thickness is 0.3 mm in each case. In any of a case where the annealing of steel sheet is performed before the Ni plating process, a case where the heating process is performed after the Ni plating process, or a case where the heating process is performed after the Ni—W alloy plating process, heating was performed in a 2% $H_2$—$N_2$ atmosphere. At that time, the low carbon aluminum killed steel was kept for 20 seconds at 740° C. and the Nb—Ti-sulc steel was kept for 20 seconds at 780° C.

[Table 1]

(2) Plating Conditions

In the Ni plating process, in a Watt bath having the configuration shown in Table 2 with the bath temperature at 60° C. and the current density set to 10 A/dm², the as-plated Ni plating layer is formed by electrolysis on the surface (the first surface) of the steel sheet which becomes the outer side of the can. In addition, in all of the Examples and Comparative Examples, Ni plating is performed on the surface, which is the inner side of the can, such that the Ni content becomes 8.9 g/m² at the same timing as the plating is performed on the surface which is the outer side of the can. In the Ni—W plating process, in a plating bath having the configuration shown in Table 3 with the bath temperature set to 60° C., the Ni—W alloy plating layer is formed by electrolysis on the surface (the first surface) of the steel sheet, which becomes the outer side of the can. In a case of using a plating bath shown in Table 3, the formed plating configuration has a current density dependence property. It is possible to form the Ni—W alloy plating layer with a high W concentration by setting a low current density and to form the Ni—W alloy plating layer with a low W concentration by performing plating at a high current density. Here, by changing the current density within a range of 1 A/dm² to 50 A/dm², the configuration of the formed Ni—W alloy plating layer is changed. In addition, in both the Ni plating process and the Ni—W alloy plating process, cathode electrolysis is performed for 5 seconds at a current density of 5 A/dm² in sulfuric acid at 40° C. at 100 g/L as pre-processing of the plating. However, in a case where the Ni—W alloy plating process is carried out continuously after the Ni plating process, washing with water is performed after the Ni plating process before the surface of the steel sheet is dried and then the immersion and electrolysis plating of the Ni—W alloy plating process are performed in a plating solution before the washing water is dried.

[Table 2]
[Table 3]

(3) Forming Conditions of the Ni Containing Layer having the Fe—Ni Diffusion Alloy Layer or the Recrystallized Ni Layer In a case where the non-annealed steel sheet was used in the Ni plating process, the annealing of the steel sheet was performed as the heating process at the same time as the Ni containing layer which has the Fe—Ni diffusion alloy layer or the recrystallized Ni layer was formed. In such a case, the low carbon aluminum killed steel was kept for 20 seconds at 740° C. and the Nb—Ti-sulc steel was kept for 20 seconds at 780° C. in a 2% $H_2$—$N_2$ atmosphere. In a case where the annealed steel sheet is used in the Ni plating process, in consideration of the influence on quality of the material of the steel sheet which is the base material, as the heating process, both the low carbon aluminum killed steel and the Nb—Ti-sulc steel were kept in a furnace for 20 seconds at a maximum temperature of 650° C. in the 2% $H_2$—$N_2$ atmosphere, and the Ni containing layer which has the Fe—Ni diffusion alloy layer or the recrystallized Ni layer was formed.

Under the conditions described above, the Ni-containing-surface-treated steel sheet for a can of the Examples 1 to 68 shown in Table 4 and the Comparative Examples 1 to 38 shown in Table 5 were prepared. Here, the upper layer shown in Table 4 and Table 5 signifies the Ni—W alloy plating layer and the lower layer signifies the Ni containing layer which has the Fe—Ni diffusion alloy layer or the recrystallized Ni layer. In the Tables, the underlining of the data indicates being outside the range of the present invention.

[Table 4]
[Table 5]

As shown below, the Ni-containing-surface-treated steel sheets for a can which were prepared as described above were evaluated on the continuous stamping property in cylindrical drawing processing, the corrosion resistance after the cylindrical drawing processing, and the sliding ability during high contact pressure. The evaluation results of Examples 1 to 68 are shown in Table 6 and the evaluation results of Comparative Examples 1 to 38 are shown in Table 7. In the Tables, the underlining of the data indicates being outside the range of the present invention. In addition, the above-described cylindrical drawing processing was carried out with multi-stage stamping in which one process includes five stages. Specifically, punching was performed to the samples in which a blank diameter is 52 mm φ, drawing was performed with the height and the diameter thereof becoming 36 mm and 16 mm respectively by fourth stage, and ironing was performed with the height thereof being 40 mm at fifth stage.

The evaluation of the continuous stamping property in the cylindrical drawing processing was performed by using the above-described multi-stage stamping, where the one process consists of five stages, for five samples per one condition, carrying out the stamping of the five processes continuously, and confirming whether it was possible for all five of the samples to be formed by the final stage (the fifth stage) or rupture occurred along the way. When the continuous stamping of the five processes was performed while continuing under the same conditions, even when there was adhesion of the plated metal to the stamping die, this was not removed. In addition, after the continuous stamping of the five processes was performed while continuing under the same conditions, when there was adhesion of the plated metal to the stamping die, this was removed. For the evaluation criteria of continuous stamping property, a case where it was possible for all five of the samples to be stamped by the final stage (the fifth stage) is set as a pass and a case where it was not possible for the stamping to be performed is set as a failure and is indicated as "B (Bad)" in the Table. A case where it was possible for all five of the samples to be formed by the final stage signifies that the sliding resistance during stamping is small and that the adhesion of the plating layer metal with respect to stamping die is small. That is, such a material may be said to be a material with an excellent continuous stamping property. However, even if it was possible to form all five of the samples by the final stage, a case where metal powder was visible on the stamped product after stamping is indicated as "B (Bad)" in the Table. In addition, in the above-described passes, among the total five samples, a case where a decrease in the glossiness was visible to the naked eye in the external appearance of the stamped product from the first process to the third process is "G (Good)", a case where a decrease in the glossiness was visible to the naked eye in the external appearance in the sample after the fourth process is "VG (Very Good)", and a case where no change in the external appearance in the glossiness was visible to the naked eye even in the sample of the fifth process is "GG (Greatly Good)" in the Table.

The evaluation of the corrosion resistance is carried out using a stamped product after stamping only in cases where the evaluation of the continuous stamping property was a pass. In order to eliminate the influence of the die state from the corrosion resistance evaluation, testing was performed by choosing a stamped product which was stamped in the first process in all of the five samples. The test conditions of the corrosion resistance evaluation were kept at a relative humidity of 95% and a temperature of 60° C. and then the presence or absence of the generation of red rust was confirmed on the fifth day, the tenth day, and the twentieth day according to the naked eye. Regarding the evaluation criteria, a case where red rust was not generated on the fifth day was indicated as a pass and a case where red rust was generated was indicated as a failure by "B (Bad)" in the Table. In the above-described passes, a case where there was no red rust generation on the fifth day but there was red rust generation on the tenth day is shown as "G (Good)", a case where there was no red rust generation on the tenth day but there was red rust generation on the twentieth day is shown as "VG (Very Good)", and a case where there was no red rust generation even on the twentieth day is shown as "GG (Greatly Good)" in the Table.

The evaluation of the sliding ability during the high contact pressure which is the basic characteristic of stamping is carried out with the die sliding test shown below. The samples were cut into strip shapes with a width of 20 mm and coated with a general anti-rust oil (NOX-RUST 550 HN: manufactured by Parker Kosan Co., Ltd.) on the surface. The samples were pinched by a stamping load of 200 kgf by the die for sliding testing, pulled out with a total sliding distance of 100 mm at a speed of 200 mm/min, and the pull-out load was measured at each sliding distance. Then, for each sliding distance, a value, where the pulled out load is divided by the stamping load, of $2\mu$ was calculated. The evaluation of the sliding ability was determined by an increase rate of an average value of $2\mu$ between sliding distances of 80 mm and 90 mm with respect to an average value of $2\mu$ between sliding distances of 20 mm and 30 mm. An increase of an average value of $2\mu$ between sliding distances of 80 mm and 90 mm with respect to $2\mu$ between sliding distances of 20 mm and 30 mm signifies that the plated metal is adhered to the die and the resistance is increased. For the above-described increase rate of $2\mu$, a case of 7% or less was set as a pass. In this pass, a case where the rising rate was 3% or less is shown as "GG (Greatly Good)", a case of more than 3% to 5% or less is shown as "VG (Very Good)", and a case of more than 5% to 7% or less is shown as "G (Good)" in the Table. Then, a case of more than 7% is shown as a failure "B (Bad)" in the Table.

[Table 6]
[Table 7]

As shown in Table 6, the states of the Ni—W alloy plating layer and the Ni containing layer of Examples 1 to 68 all achieve the object and, as a result, the continuous stamping property, the corrosion resistance, and the sliding ability thereof are passes.

The continuous stamping property and the sliding ability exhibited excellent performances as the thickness of the Ni—W alloy plating layer became thicker in a range up to 2 μm and as the W concentration in the Ni—W alloy plating layer became higher in a range up to 65 mass %. Specifically, for a case where the W concentration in the Ni—W alloy plating layer is less than 15% as in Example 10 and a case where the thickness of the Ni—W alloy plating layer is less than 0.05 μm as in Example 20, the continuous stamping property and the sliding ability were "G (Good)". For a case where the W concentration in the Ni—W alloy plating layer is 15% to less than 31% as in Examples 11 to 13, 32, 33, 42, 43, 52, 53, 62, and 63 and a case where the thickness of the Ni—W alloy plating layer is from 0.05 μm to 0.1 μm, the continuous stamping property and the sliding ability were "VG (Very Good)". Then, for a case where the W concentration in the Ni—W alloy plating layer is 31% to 65% and the thickness of the Ni—W alloy plating layer is from 0.1 μm to 2 μm as in Examples 1 to 7, 14 to 19, 23 to 31, 34, 35, 37 to 41, 44, 45, 47 to 51, 54, 55, 57 to 61, 64, 65, 67 and 68, the continuous stamping property and the sliding ability were "GG (Greatly Good)". However, for Examples 8 and 9 where the Ni content which is included in the Ni containing layer which has the Fe—Ni diffusion alloy layer and the recrystallized Ni layer is over 40 g/m$^2$, the W concentration in the Ni—W alloy plating layer was 31% or more and 65% or less but since the thickness of the Ni containing layer was excessively thick, the continuous stamping property and the sliding ability were "VG (Very Good)".

The corrosion resistance exhibited an excellent performance as the Ni content which was included in the Ni containing layer which had a Fe—Ni diffusion alloy layer or a recrystallized Ni layer was increased. However, even when the W concentration and the thickness of the Ni—W alloy plating layer were the same and the Ni content which was included in the Ni containing layer which had the Fe—Ni diffusion alloy layer or the recrystallized Ni layer was the same, the corrosion resistance was different according to the presence or absence of annealing of the steel sheet which is the base material. Specifically, as in Example 1, 29, and 39, a case where non-annealed material was used as the steel sheet which is the base material, a Fe—Ni diffusion alloy layer was formed at a high temperature along with the performing of the annealing of the steel sheet in the heating process, and the recrystallized Ni layer did not remain in the Ni containing layer was "G (Good)". With respect to these, as in Example 49 and 59, a case where the recrystallized Ni layer did not remain in the Ni containing layer without the Fe—Ni diffusion alloy layer being particularly thick, due to annealed material being used as the steel sheet which is the base material and a Fe—Ni diffusion alloy layer being formed at a low temperature was "VG (Very Good)". This is because, since the recrystallized Ni layer is softer than the Fe—Ni diffusion alloy layer, the effect of suppressing the propagation of the cracks which appear in the Ni—W alloy plating is high.

On the other hand, none of the states of the Ni—W alloy plating layer and the Ni containing layer of Comparative Examples 1 to 38 achieve the object and, as a result, the continuous stamping property, the corrosion resistance, and the sliding ability are insufficient.

Comparative Example 1 did not have a recrystallized Ni layer in the Ni containing layer, the Ni content in the Ni containing layer which included the Fe—Ni diffusion alloy layer was less than 5 g/m², and the corrosion resistance was a failure. This is because cracks which appeared in the Ni—W alloy plating layer penetrated into the Ni containing layer which included the Fe—Ni diffusion alloy layer and reached the steel sheet which was the base material.

For Comparative Example 2 the Ni content which was included in the Ni containing layer which had the Fe—Ni diffusion alloy layer and the recrystallized Ni layer was over 89 g/m², the Ni content was extremely great, and the continuous stamping property and the sliding ability were failures. This is because the recrystallized Ni layer was exposed from the cracks in the Ni—W alloy plating layer and adhered to the die.

For Comparative Example 3, the W concentration in the Ni—W alloy plating layer was less than 10 mass % and the continuous stamping property and the sliding ability were failures. This is because, since the W concentration in the Ni—W alloy plating layer was low, the hardness of Ni—W alloy plating was low, and there was adhesion to the die.

For Comparative Example 4, the W concentration in the Ni—W alloy plating layer was over 65 mass % and it was possible to stamp all five of the samples; however, metal powder was visible on the surface and the continuous stamping property was a failure. This is because the plating layer was too hard and powdering was generated.

For Comparative Example 5, the thickness of the Ni—W alloy plating layer was 0.02 μm or less and the continuous stamping property and the sliding ability were failures. This is because, since the Ni—W alloy plating layer was excessively thin, the underlying recrystallized Ni layer was exposed to the surface and adhesion occurred.

For Comparative Example 6, the thickness of the Ni—W alloy plating layer was increased by more than 2 μm, and it was possible to stamp all five of the samples; however, metal powder was visible on the surface and the continuous stamping property was a failure. This is because the hard Ni—W alloy plating layer was excessively thick and powdering was generated.

For a case where there was no Ni—W alloy plating layer as in Comparative Examples 7 to 16, 33, and 36, the continuous stamping property was a failure in the above-described Comparative Examples other than Comparative Example 7. This is because the Ni containing layer which had the Fe—Ni diffusion alloy layer or the recrystallized Ni layer was adhered to the die. Only the Comparative Example 7 had a pass for the continuous stamping property; however, the corrosion resistance was a failure. For Comparative Example 7, the Ni content in the Ni containing layer which had the Fe—Ni diffusion alloy layer was low and a comparatively hard Ni containing layer which has a Fe—Ni diffusion alloy layer which had a high Fe concentration was formed by the heating process, whereby adhesion to the die did not easily occur. However, for the Comparative Example 7, since the Fe concentration of the Fe—Ni diffusion alloy layer which was included in the Ni containing layer was high, the corrosion resistance was a failure.

For the examples which did not have a Ni containing layer which had the Fe—Ni diffusion alloy layer or the recrystallized Ni layer as in the Comparative Examples 17 to 32, 34, 35, 37, and 38, all the corrosion resistances thereof were failures. This is because the cracks appeared in the Ni—W alloy plating layer, there was no layer which suppressed the propagation thereof, and cracks reached the steel sheet which was the base material.

Above, detailed description has been given of suitable embodiments of the present invention with reference to the accompanying drawings; however, the present invention is not limited to these examples. It is clear that a person of ordinary skill in the field of technology to which this invention belongs will be able to conceive of various types of modifications and corrections in the scope of the technical idea which is described in the scope of the patent claims, and it is understood that these also naturally belong to the technical scope of the present invention.

INDUSTRIAL APPLICABILITY

According to the above-described aspect of the present invention, since it is possible to provide a Ni-containing-surface-treated steel sheet for a can and a manufacturing method thereof where adhesion to a plated metal die during continuous stamping is not easily generated and which has a high corrosion resistance even after stamping, the industrial applicability is high.

DESCRIPTION OF REFERENCE NUMERALS AND SIGNS

Ni—W ALLOY PLATING LAYER
2 FE—NI DIFFUSION ALLOY LAYER (Ni-CONTAINING LAYER)
3 STEEL SHEET
4 RECRYSTALLIZED NI LAYER (Ni-CONTAINING LAYER)
5 CAN

TABLE 1

| Steel Type | Main Component Mass % in Steel excluding Fe | | | | | |
| --- | --- | --- | --- | --- | --- | --- |
| | C | Si | Mn | P | Ti | Nb |
| Low carbon aluminum killed steel | 0.055 | 0.009 | 0.29 | 0.014 | — | — |
| Ultra-low carbon steel | 0.0014 | 0.009 | 0.11 | 0.005 | 0.017 | 0.014 |

TABLE 2

| Component | Concentration |
| --- | --- |
| Hexahydrate nickel sulfate | 330 g/L |
| Hexahydrate nickel chlorate | 45 g/L |
| Boric acid | 38 g/L |

TABLE 3

| Component | Concentration |
| --- | --- |
| Sodium tungstate dihydrate | 33.0 g/L |
| Nickel sulfate | 26.3 g/L |
| Diammonium hydrogen citrate | 49.8 g/L |

TABLE 4-1

| | Manufacturing Conditions | | | | | | | | Plating Configuration | | |
|---|---|---|---|---|---|---|---|---|---|---|---|
| | Upper layer | | Lower layer Ni content g/m² | Base Material Steel Sheet | | Order of Manufacturing Process | Heating Process Conditions | | | | |
| | W concentration Mass % | Thickness μm | | Steel Type | Annealing Present/Absent | | Heating Temperature | Keeping Time | Ni—W alloy plating layer Present/Absent | Recrystallized Ni layer Present/Absent | Fe—Ni diffusion alloy layer Present/Absent |
| Example 1 | 36% | 0.3 | 5.3 | Low carbon aluminum killed steel | Non-annealed material | Ni plating process ⇒ Ni—W alloy plating process ⇒ Heating process | 740° C. | 20 sec | Present | Absent | Present |
| Example 2 | 36% | 0.3 | 7.1 | | Non-annealed material | | 740° C. | 20 sec | Present | Present | Present |
| Example 3 | 36% | 0.3 | 8.9 | | Non-annealed material | | 740° C. | 20 sec | Present | Present | Present |
| Example 4 | 36% | 0.3 | 13.3 | | Non-annealed material | | 740° C. | 20 sec | Present | Present | Present |
| Example 5 | 36% | 0.3 | 17.7 | | Non-annealed material | | 740° C. | 20 sec | Present | Present | Present |
| Example 6 | 36% | 0.3 | 26.6 | | Non-annealed material | | 740° C. | 20 sec | Present | Present | Present |
| Example 7 | 36% | 0.3 | 35.4 | | Non-annealed material | | 740° C. | 20 sec | Present | Present | Present |
| Example 8 | 36% | 0.3 | 44.3 | | Non-annealed material | | 740° C. | 20 sec | Present | Present | Present |
| Example 9 | 36% | 0.3 | 79.7 | | Non-annealed material | | 740° C. | 20 sec | Present | Present | Present |
| Example 10 | 13% | 0.3 | 13.3 | Low carbon aluminum killed steel | Non-annealed material | Ni plating process ⇒ Ni—W alloy plating process ⇒ Heating process | 740° C. | 20 sec | Present | Present | Present |
| Example 11 | 19% | 0.3 | 13.3 | | Non-annealed material | | 740° C. | 20 sec | Present | Present | Present |
| Example 12 | 25% | 0.3 | 13.3 | | Non-annealed material | | 740° C. | 20 sec | Present | Present | Present |
| Example 13 | 30% | 0.3 | 13.3 | | Non-annealed material | | 740° C. | 20 sec | Present | Present | Present |
| Example 14 | 31% | 0.3 | 13.3 | | Non-annealed material | | 740° C. | 20 sec | Present | Present | Present |
| Example 15 | 32% | 0.3 | 13.3 | | Non-annealed material | | 740° C. | 20 sec | Present | Present | Present |
| Example 16 | 43% | 0.3 | 13.3 | | Non-annealed material | | 740° C. | 20 sec | Present | Present | Present |
| Example 17 | 54% | 0.3 | 13.3 | | Non-annealed material | | 740° C. | 20 sec | Present | Present | Present |
| Example 18 | 58% | 0.3 | 13.3 | | Non-annealed material | | 740° C. | 20 sec | Present | Present | Present |
| Example 19 | 63% | 0.3 | 13.3 | | Non-annealed material | | 740° C. | 20 sec | Present | Present | Present |

TABLE 4-2

| | Manufacturing Conditions | | | | | | | | Plating Configuration | | |
|---|---|---|---|---|---|---|---|---|---|---|---|
| | Upper layer | | Lower layer Ni content g/m² | Base Material Steel Sheet | | | Heating Process Conditions | | | | |
| | W concentration Mass % | Thickness μm | | Steel Type | Annealing Present/Absent | Order of Manufacturing Process | Heating Temperature | Keeping Time | Ni—W alloy plating layer Present/Absent | Recrystallized Ni layer Present/Absent | Fe—Ni diffusion alloy layer Present/Absent |
| Example 20 | 36% | 0.02 | 13.3 | Low carbon aluminum killed steel | Non-annealed material | Ni plating process ⇒ Ni—W alloy plating process ⇒ Heating process | 740° C. | 20 sec | Present | Present | Present |
| Example 21 | 36% | 0.05 | 13.3 | | Non-annealed material | | 740° C. | 20 sec | Present | Present | Present |
| Example 22 | 36% | 0.07 | 13.3 | | Non-annealed material | | 740° C. | 20 sec | Present | Present | Present |
| Example 23 | 36% | 0.1 | 13.3 | | Non-annealed material | | 740° C. | 20 sec | Present | Present | Present |
| Example 24 | 36% | 0.5 | 13.3 | | Non-annealed material | | 740° C. | 20 sec | Present | Present | Present |
| Example 25 | 36% | 0.7 | 13.3 | | Non-annealed material | | 740° C. | 20 sec | Present | Present | Present |
| Example 26 | 36% | 1 | 13.3 | | Non-annealed material | | 740° C. | 20 sec | Present | Present | Present |
| Example 27 | 36% | 1.5 | 13.3 | | Non-annealed material | | 740° C. | 20 sec | Present | Present | Present |
| Example 28 | 36% | 2 | 13.3 | | Non-annealed material | | 740° C. | 20 sec | Present | Present | Present |
| Example 29 | 36% | 0.3 | 5.3 | Low carbon aluminum killed steel | Non-annealed material | Ni plating process ⇒ Heating process | 740° C. | 20 sec | Present | Absent | Present |
| Example 30 | 36% | 0.3 | 13.3 | | Non-annealed material | | 740° C. | 20 sec | Present | Present | Present |
| Example 31 | 36% | 0.3 | 26.6 | | Non-annealed material | | 740° C. | 20 sec | Present | Present | Present |
| Example 32 | 19% | 0.3 | 13.3 | | Non-annealed material | Film removal process ⇒ Ni—W alloy plating process ⇒ | 740° C. | 20 sec | Present | Present | Present |
| Example 33 | 30% | 0.3 | 13.3 | | Non-annealed material | | 740° C. | 20 sec | Present | Present | Present |
| Example 34 | 31% | 0.3 | 13.3 | | Non-annealed material | | 740° C. | 20 sec | Present | Present | Present |
| Example 35 | 54% | 0.3 | 13.3 | | Non-annealed material | | 740° C. | 20 sec | Present | Present | Present |
| Example 36 | 36% | 0.05 | 13.3 | | Non-annealed material | | 740° C. | 20 sec | Present | Present | Present |
| Example 37 | 36% | 0.1 | 13.3 | | Non-annealed material | | 740° C. | 20 sec | Present | Present | Present |
| Example 38 | 36% | 1 | 13.3 | | Non-annealed material | | 740° C. | 20 sec | Present | Present | Present |

TABLE 4-3

| | Manufacturing Conditions | | | | | | | | Plating Configuration | | |
|---|---|---|---|---|---|---|---|---|---|---|---|
| | Upper layer | | Lower layer | Base Material Steel Sheet | | Order of Manufacturing Process | Heating Process Conditions | | Ni—W alloy plating layer Present/Absent | Ni layer Recrystallized Present/Absent | Fe—Ni diffusion alloy layer Present/Absent |
| | W concentration Mass % | Thickness μm | Ni content g/m² | Steel Type | Annealing Present/Absent | | Heating Temperature | Keeping Time | | | |
| Example 39 | 36% | 0.3 | 5.3 | Ultra-low carbon steel | Non-annealed material | Ni plating process ⇒ Ni—W alloy plating process ⇒ Heating process | 780° C. | 20 sec | Present | Absent | Present |
| Example 40 | 36% | 0.3 | 13.3 | | Non-annealed material | | 780° C. | 20 sec | Present | Present | Present |
| Example 41 | 36% | 0.3 | 26.6 | | Non-annealed material | | 780° C. | 20 sec | Present | Present | Present |
| Example 42 | 19% | 0.3 | 13.3 | | Non-annealed material | | 780° C. | 20 sec | Present | Present | Present |
| Example 43 | 30% | 0.3 | 13.3 | | Non-annealed material | | 780° C. | 20 sec | Present | Present | Present |
| Example 44 | 31% | 0.3 | 13.3 | | Non-annealed material | | 780° C. | 20 sec | Present | Present | Present |
| Example 45 | 58% | 0.3 | 13.3 | | Non-annealed material | | 780° C. | 20 sec | Present | Present | Present |
| Example 46 | 36% | 0.05 | 13.3 | | Non-annealed material | | 780° C. | 20 sec | Present | Present | Present |
| Example 47 | 36% | 0.1 | 13.3 | | Non-annealed material | | 740° C. | 20 sec | Present | Present | Present |
| Example 48 | 36% | 1 | 13.3 | | Non-annealed material | | 780° C. | 20 sec | Present | Present | Present |
| Example 49 | 36% | 0.3 | 5.3 | Low carbon aluminum killed steel | Annealed material | Ni plating process ⇒ Heating process ⇒ Film removal process ⇒ Ni—W alloy plating process | 650° C. | 20 sec | Present | Present | Present |
| Example 50 | 36% | 0.3 | 13.3 | | Annealed material | | 650° C. | 20 sec | Present | Present | Present |
| Example 51 | 36% | 0.3 | 26.6 | | Annealed material | | 650° C. | 20 sec | Present | Present | Present |
| Example 52 | 19% | 0.3 | 13.3 | | Annealed material | | 650° C. | 20 sec | Present | Present | Present |
| Example 53 | 30% | 0.3 | 13.3 | | Annealed material | | 650° C. | 20 sec | Present | Present | Present |
| Example 54 | 31% | 0.3 | 13.3 | | Annealed material | | 650° C. | 20 sec | Present | Present | Present |
| Example 55 | 58% | 0.3 | 13.3 | | Annealed material | | 650° C. | 20 sec | Present | Present | Present |
| Example 56 | 36% | 0.05 | 13.3 | | Annealed material | | 650° C. | 20 sec | Present | Present | Present |
| Example 57 | 36% | 0.1 | 13.3 | | Annealed material | | 650° C. | 20 sec | Present | Present | Present |
| Example 58 | 36% | 1 | 13.3 | | Annealed material | | 650° C. | 20 sec | Present | Present | Present |

TABLE 4-4

| | Upper layer | | Lower layer Ni content g/m2 | Manufacturing Conditions | | | | Plating Configuration | | |
|---|---|---|---|---|---|---|---|---|---|---|
| | W concentration Mass % | Thickness μm | | Base Material Steel Sheet | | Order of Manufacturing Process | Heating Process Conditions | | Ni—W alloy plating layer Present/Absent | Recrystallized Ni layer Present/Absent | Fe—Ni diffusion alloy layer Present/Absent |
| | | | | Steel Type | Annealing Present/Absent | | Heating Temperature | Keeping Time | | | |
| Example 59 | 36% | 0.3 | 5.3 | Low carbon aluminum killed steel | Annealed material | Ni plating process ⇓ Ni—W alloy plating process ⇓ Heating process | 650° C. | 20 sec | Present | Present | Present |
| Example 60 | 36% | 0.3 | 13.3 | | Annealed material | | 650° C. | 20 sec | Present | Present | Present |
| Example 61 | 36% | 0.3 | 26.6 | | Annealed material | | 650° C. | 20 sec | Present | Present | Present |
| Example 62 | 19% | 0.3 | 13.3 | | Annealed material | | 650° C. | 20 sec | Present | Present | Present |
| Example 63 | 30% | 0.3 | 13.3 | | Annealed material | | 650° C. | 20 sec | Present | Present | Present |
| Example 64 | 31% | 0.3 | 13.3 | | Annealed material | | 650° C. | 20 sec | Present | Present | Present |
| Example 65 | 58% | 0.3 | 13.3 | | Annealed material | | 650° C. | 20 sec | Present | Present | Present |
| Example 66 | 36% | 0.05 | 13.3 | | Annealed material | | 650° C. | 20 sec | Present | Present | Present |
| Example 67 | 36% | 0.1 | 13.3 | | Annealed material | | 650° C. | 20 sec | Present | Present | Present |
| Example 68 | 36% | 1 | 13.3 | | Annealed material | | 650° C. | 20 sec | Present | Present | Present |

TABLE 5-1

| | Upper layer | | Lower layer Ni content g/m2 | Manufacturing Conditions | | | | | Plating Configuration | | |
|---|---|---|---|---|---|---|---|---|---|---|---|
| | W concentration Mass % | Thickness μm | | Base Material Steel Sheet | | Order of Manufacturing Process | Heating Process Conditions | | Ni—W alloy plating layer Present/Absent | Recrystallized Ni layer Present/Absent | Fe—Ni diffusion alloy layer Present/Absent |
| | | | | Steel Type | Annealing Present/Absent | | Heating Temperature | Keeping Time | | | |
| Comparative Example 1 | 36% | 0.3 | 2.7 | Low carbon aluminum killed steel | Non-annealed material | Ni plating process ⇓ Ni—W alloy plating process ⇓ Heating process | 740° C. | 20 sec | Present | Absent | Present |
| Comparative Example 2 | 36% | 0.3 | 177.0 | | Non-annealed material | | 740° C. | 20 sec | Present | Present | Present |
| Comparative Example 3 | 6% | 0.3 | 13.3 | | Non-annealed material | | 740° C. | 20 sec | Present | Present | Present |
| Comparative Example 4 | 67% | 0.3 | 13.3 | | Non-annealed material | | 740° C. | 20 sec | Present | Present | Present |
| Comparative Example 5 | 36% | 0.01 | 13.3 | | Non-annealed material | | 740° C. | 20 sec | Present | Present | Present |
| Comparative Example 6 | 36% | 5 | 13.3 | | Non-annealed material | | 740° C. | 20 sec | Present | Present | Present |
| Comparative Example 7 | 0% | 0 | 2.7 | Low carbon aluminum killed steel | Non-annealed material | Ni plating process ⇓ Heating process | 740° C. | 20 sec | Absent | Absent | Present |
| Comparative Example 8 | 0% | 0 | 5.3 | | Non-annealed material | | 740° C. | 20 sec | Absent | Absent | Present |
| Comparative Example 9 | 0% | 0 | 7.1 | | Non-annealed material | | 740° C. | 20 sec | Absent | Present | Present |
| Comparative Example 10 | 0% | 0 | 8.9 | | Non-annealed material | | 740° C. | 20 sec | Absent | Present | Present |
| Comparative Example 11 | 0% | 0 | 13.3 | | Non-annealed material | | 740° C. | 20 sec | Absent | Present | Present |
| Comparative Example 12 | 0% | 0 | 15.9 | | Non-annealed material | | 740° C. | 20 sec | Absent | Present | Present |
| Comparative Example 13 | 0% | 0 | 17.7 | | Non-annealed material | | 740° C. | 20 sec | Absent | Present | Present |
| Comparative Example 14 | 0% | 0 | 26.6 | | Non-annealed material | | 740° C. | 20 sec | Absent | Present | Present |
| Comparative Example 15 | 0% | 0 | 35.4 | | Non-annealed material | | 740° C. | 20 sec | Absent | Present | Present |
| Comparative Example 16 | 0% | 0 | 44.3 | | Non-annealed material | | 740° C. | 20 sec | Absent | Present | Present |

TABLE 5-2

| | Upper layer | | Lower layer Ni content g/m² | Manufacturing Conditions | | | | | Plating Configuration | | |
|---|---|---|---|---|---|---|---|---|---|---|---|
| | W concentration Mass % | Thickness μm | | Base Material Steel Sheet | | Order of Manufacturing Process | Heating Process Conditions | | Ni—W alloy plating layer Present/Absent | Recrystallized Ni layer Present/Absent | Fe—Ni diffusion alloy layer Present/Absent |
| | | | | Steel Type | Annealing Present/Absent | | Heating Temperature | Keeping Time | | | |
| Comparative Example 17 | 36% | 0.02 | 0.0 | Low carbon aluminum killed steel | Non-annealed material | Ni—W alloy plating process only | 740° C. | 20 sec | Present | Absent | Absent |
| Comparative Example 18 | 36% | 0.05 | 0.0 | | Non-annealed material | | 740° C. | 20 sec | Present | Absent | Absent |
| Comparative Example 19 | 36% | 0.1 | 0.0 | | Non-annealed material | | 740° C. | 20 sec | Present | Absent | Absent |
| Comparative Example 20 | 36% | 0.3 | 0.0 | | Non-annealed material | | 740° C. | 20 sec | Present | Absent | Absent |
| Comparative Example 21 | 36% | 0.7 | 0.0 | | Non-annealed material | | 740° C. | 20 sec | Present | Absent | Absent |
| Comparative Example 22 | 36% | 1 | 0.0 | | Non-annealed material | | 740° C. | 20 sec | Present | Absent | Absent |
| Comparative Example 23 | 36% | 1.5 | 0.0 | | Non-annealed material | | 740° C. | 20 sec | Present | Absent | Absent |
| Comparative Example 24 | 36% | 1.8 | 0.0 | | Non-annealed material | | 740° C. | 20 sec | Present | Absent | Absent |
| Comparative Example 25 | 13% | 1.8 | 0.0 | Low carbon aluminum killed steel | Non-annealed material | Ni—W alloy plating process only | 740° C. | 20 sec | Present | Absent | Absent |
| Comparative Example 26 | 19% | 1.8 | 0.0 | | Non-annealed material | | 740° C. | 20 sec | Present | Absent | Absent |
| Comparative Example 27 | 25% | 1.8 | 0.0 | | Non-annealed material | | 740° C. | 20 sec | Present | Absent | Absent |
| Comparative Example 28 | 30% | 1.8 | 0.0 | | Non-annealed material | | 740° C. | 20 sec | Present | Absent | Absent |
| Comparative Example 29 | 31% | 1.8 | 0.0 | | Non-annealed material | | 740° C. | 20 sec | Present | Absent | Absent |
| Comparative Example 30 | 32% | 1.8 | 0.0 | | Non-annealed material | | 740° C. | 20 sec | Present | Absent | Absent |
| Comparative Example 31 | 43% | 1.8 | 0.0 | | Non-annealed material. | | 740° C. | 20 sec | Present | Absent | Absent |
| Comparative Example 32 | 54% | 1.8 | 0.0 | | Non-annealed material | | 740° C. | 20 sec | Present | Absent | Absent |

TABLE 5-3

| | Upper layer | | Lower layer Ni content g/m² | Manufacturing Conditions | | | | | Plating Configuration | | |
|---|---|---|---|---|---|---|---|---|---|---|---|
| | W concentration Mass % | Thickness μm | | Base Material Steel Sheet | | Order of Manufacturing Process | Heating Process Conditions | | Ni—W alloy plating layer Present/Absent | Recrystallized Ni layer Present/Absent | Fe—Ni diffusion alloy layer Present/Absent |
| | | | | Steel Type | Annealing Present/Absent | | Heating Temperature | Keeping Time | | | |
| Comparative Example 33 | 0% | 0 | 15.9 | Ultra-low carbon steel | Non-annealed material | Ni plating process ⇓ Heating process | 780° C. | 20 sec | Absent | Present | Present |
| Comparative Example 34 | 36% | 0.3 | 0.0 | | Non-annealed material | Ni—W alloy plating process only | — | — | Present | Absent | Absent |
| Comparative Example 35 | 36% | 1.8 | 0.0 | | Non-annealed material | | — | — | Present | Absent | Absent |
| Comparative Example 36 | 0% | 0 | 15.9 | Low carbon aluminum killed steel | Annealed material | Ni plating process ⇓ Heating process | 650° C. | 20 sec | Absent | Present | Present |
| Comparative Example 37 | 36% | 0.3 | 0.0 | | Annealed material | Ni—W alloy plating process only | — | — | Present | Absent | Absent |
| Comparative Example 38 | 36% | 1.8 | 0.0 | | Annealed material | | — | — | Present | Absent | Absent |

TABLE 6-1

| | Upper layer | | Lower Layer | Plating Configuration | | Evaluation Results | | Sliding ability | |
|---|---|---|---|---|---|---|---|---|---|
| | W concentration Mass % | Thickness μm | Ni content g/m² | Ni—W alloy plating layer Present/Absent | Recrystallized Ni layer Present/Absent | Fe—Ni diffusion alloy layer Present/Absent | Continuous stamping property | Corrosion resistance | 2μ increase rate | Evaluation |
| Example 1 | 36% | 0.3 | 5.3 | Present | Absent | Present | GG | G | 2% | GG |
| Example 2 | 36% | 0.3 | 7.1 | Present | Present | Present | GG | GG | 2% | GG |
| Example 3 | 36% | 0.3 | 8.9 | Present | Present | Present | GG | GG | 2% | GG |
| Example 4 | 36% | 0.3 | 13.3 | Present | Present | Present | GG | GG | 2% | GG |
| Example 5 | 36% | 0.3 | 17.7 | Present | Present | Present | GG | GG | 2% | GG |
| Example 6 | 36% | 0.3 | 26.6 | Present | Present | Present | GG | GG | 2% | GG |
| Example 7 | 36% | 0.3 | 35.4 | Present | Present | Present | GG | GG | 2% | GG |
| Example 8 | 36% | 0.3 | 44.3 | Present | Present | Present | VG | GG | 4% | VG |
| Example 9 | 36% | 0.3 | 79.7 | Present | Present | Present | VG | GG | 4% | VG |
| Example 10 | 13% | 0.3 | 13.3 | Present | Present | Present | G | GG | 6% | G |
| Example 11 | 19% | 0.3 | 13.3 | Present | Present | Present | VG | GG | 5% | VG |
| Example 12 | 25% | 0.3 | 13.3 | Present | Present | Present | VG | GG | 4% | VG |
| Example 13 | 30% | 0.3 | 13.3 | Present | Present | Present | VG | GG | 4% | VG |
| Example 14 | 31% | 0.3 | 13.3 | Present | Present | Present | GG | GG | 2% | GG |
| Example 15 | 32% | 0.3 | 13.3 | Present | Present | Present | GG | GG | 2% | GG |
| Example 16 | 43% | 0.3 | 13.3 | Present | Present | Present | GG | GG | 2% | GG |
| Example 17 | 54% | 0.3 | 13.3 | Present | Present | Present | GG | GG | 2% | GG |
| Example 18 | 58% | 0.3 | 13.3 | Present | Present | Present | GG | GG | 2% | GG |
| Example 19 | 63% | 0.3 | 13.3 | Present | Present | Present | GG | GG | 3% | GG |
| Example 20 | 36% | 0.02 | 13.3 | Present | Present | Present | G | GG | 7% | G |
| Example 21 | 36% | 0.05 | 13.3 | Present | Present | Present | VG | GG | 5% | VG |
| Example 22 | 36% | 0.07 | 13.3 | Present | Present | Present | VG | GG | 4% | VG |
| Example 23 | 36% | 0.1 | 13.3 | Present | Present | Present | GG | GG | 3% | GG |
| Example 24 | 36% | 0.5 | 13.3 | Present | Present | Present | GG | GG | 2% | GG |
| Example 25 | 36% | 0.7 | 13.3 | Present | Present | Present | GG | GG | 2% | GG |
| Example 26 | 36% | 1 | 13.3 | Present | Present | Present | GG | GG | 2% | GG |
| Example 27 | 36% | 1.5 | 13.3 | Present | Present | Present | GG | GG | 2% | GG |
| Example 28 | 36% | 2 | 13.3 | Present | Present | Present | GG | GG | 2% | GG |
| Example 29 | 36% | 0.3 | 5.3 | Present | Absent | Present | GG | G | 2% | GG |
| Example 30 | 36% | 0.3 | 13.3 | Present | Present | Present | GG | GG | 2% | GG |
| Example 31 | 36% | 0.3 | 26.6 | Present | Present | Present | GG | GG | 2% | GG |
| Example 32 | 19% | 0.3 | 13.3 | Present | Present | Present | VG | GG | 5% | VG |
| Example 33 | 30% | 0.3 | 13.3 | Present | Present | Present | VG | GG | 4% | VG |
| Example 34 | 31% | 0.3 | 13.3 | Present | Present | Present | GG | GG | 2% | GG |

TABLE 6-2

| | Upper layer | | Lower Layer | Plating Configuration | | Evaluation Results | | Sliding ability | |
|---|---|---|---|---|---|---|---|---|---|
| | W concentration Mass % | Thickness μm | Ni content g/m² | Ni—W alloy plating layer Present/Absent | Recrystallized Ni layer Present/Absent | Fe—Ni diffusion alloy layer Present/Absent | Continuous stamping property | Corrosion resistance | 2μ increase rate | Evaluation |
| Example 35 | 54% | 0.3 | 13.3 | Present | Present | Present | GG | GG | 2% | GG |
| Example 36 | 36% | 0.05 | 13.3 | Present | Present | Present | VG | GG | 5% | VG |
| Example 37 | 36% | 0.1 | 13.3 | Present | Present | Present | GG | GG | 3% | GG |
| Example 38 | 36% | 1 | 13.3 | Present | Present | Present | GG | GG | 2% | GG |
| Example 39 | 36% | 0.3 | 5.3 | Present | Absent | Present | GG | G | 2% | GG |
| Example 40 | 36% | 0.3 | 13.3 | Present | Present | Present | GG | GG | 2% | GG |
| Example 41 | 36% | 0.3 | 26.6 | Present | Present | Present | GG | GG | 2% | GG |
| Example 42 | 19% | 0.3 | 13.3 | Present | Present | Present | VG | GG | 5% | VG |
| Example 43 | 30% | 0.3 | 13.3 | Present | Present | Present | VG | GG | 4% | VG |
| Example 44 | 31% | 0.3 | 13.3 | Present | Present | Present | GG | GG | 2% | GG |
| Example 45 | 58% | 0.3 | 13.3 | Present | Present | Present | GG | GG | 2% | GG |
| Example 46 | 36% | 0.05 | 13.3 | Present | Present | Present | VG | GG | 5% | VG |
| Example 47 | 36% | 0.1 | 13.3 | Present | Present | Present | GG | GG | 3% | GG |
| Example 48 | 36% | 1 | 13.3 | Present | Present | Present | GG | GG | 2% | GG |
| Example 49 | 36% | 0.3 | 5.3 | Present | Present | Present | GG | VG | 2% | GG |
| Example 50 | 36% | 0.3 | 13.3 | Present | Present | Present | GG | GG | 2% | GG |
| Example 51 | 36% | 0.3 | 26.6 | Present | Present | Present | GG | GG | 2% | GG |
| Example 52 | 19% | 0.3 | 13.3 | Present | Present | Present | VG | GG | 5% | VG |
| Example 53 | 30% | 0.3 | 13.3 | Present | Present | Present | VG | GG | 4% | VG |
| Example 54 | 31% | 0.3 | 13.3 | Present | Present | Present | GG | GG | 2% | GG |
| Example 55 | 58% | 0.3 | 13.3 | Present | Present | Present | GG | GG | 2% | GG |
| Example 56 | 36% | 0.05 | 13.3 | Present | Present | Present | VG | GG | 5% | VG |
| Example 57 | 36% | 0.1 | 13.3 | Present | Present | Present | GG | GG | 3% | GG |
| Example 58 | 36% | 1 | 13.3 | Present | Present | Present | GG | GG | 2% | GG |

TABLE 6-2-continued

|  | Upper layer | | Lower Layer | Plating Configuration | | | Evaluation Results | | | |
|---|---|---|---|---|---|---|---|---|---|---|
|  | | | | | | Fe—Ni | | | Sliding ability | |
|  | W concentration Mass % | Thickness μm | Ni content g/m² | Ni—W alloy plating layer Present/Absent | Recrystallized Ni layer Present/Absent | diffusion alloy layer Present/Absent | Continuous stamping property | Corrosion resistance | 2μ increase rate | Evaluation |
| Example 59 | 36% | 0.3 | 5.3 | Present | Present | Present | GG | VG | 2% | GG |
| Example 60 | 36% | 0.3 | 13.3 | Present | Present | Present | GG | GG | 2% | GG |
| Example 61 | 36% | 0.3 | 26.6 | Present | Present | Present | GG | GG | 2% | GG |
| Example 62 | 19% | 0.3 | 13.3 | Present | Present | Present | VG | GG | 5% | VG |
| Example 63 | 30% | 0.3 | 13.3 | Present | Present | Present | VG | GG | 4% | VG |
| Example 64 | 31% | 0.3 | 13.3 | Present | Present | Present | GG | GG | 2% | GG |
| Example 65 | 58% | 0.3 | 13.3 | Present | Present | Present | GG | GG | 2% | GG |
| Example 66 | 36% | 0.05 | 13.3 | Present | Present | Present | VG | GG | 5% | VG |
| Example 67 | 36% | 0.1 | 13.3 | Present | Present | Present | GG | GG | 3% | GG |
| Example 68 | 36% | 1 | 13.3 | Present | Present | Present | GG | GG | 2% | GG |

TABLE 7-1

|  | Upper layer | | Lower Layer | Plating Configuration | | | Evaluation Results | | | |
|---|---|---|---|---|---|---|---|---|---|---|
|  | | | | | | Fe—Ni | | | Sliding ability | |
|  | W concentration Mass % | Thickness μm | Ni content g/m² | Ni—W alloy plating layer Present/Absent | Recrystallized Ni layer Present/Absent | diffusion alloy layer Present/Absent | Continuous stamping property | Corrosion resistance | 2μ increase rate | Evaluation |
| Comparative Example 1 | 36% | 0.3 | 2.7 | Present | Absent | Present | GG | B | 2% | GG |
| Comparative Example 2 | 36% | 0.3 | 177.0 | Present | Present | Present | B | — | 9% | B |
| Comparative Example 3 | 6% | 0.3 | 13.3 | Present | Present | Present | B | — | 8% | B |
| Comparative Example 4 | 67% | 0.3 | 13.3 | Present | Present | Present | B | GG | 4% | VG |
| Comparative Example 5 | 36% | 0.01 | 13.3 | Present | Present | Present | B | — | 9% | B |
| Comparative Example 6 | 36% | 5 | 13.3 | Present | Present | Present | B | GG | 4% | VG |
| Comparative Example 7 | 0% | 0 | 2.7 | Absent | Absent | Present | G | B | 6% | G |
| Comparative Example 8 | 0% | 0 | 5.3 | Absent | Absent | Present | B | — | 8% | B |
| Comparative Example 9 | 0% | 0 | 7.1 | Absent | Present | Present | B | — | 9% | B |
| Comparative Example 10 | 0% | 0 | 8.9 | Absent | Present | Present | B | — | 9% | B |
| Comparative Example 11 | 0% | 0 | 13.3 | Absent | Present | Present | B | — | 9% | B |
| Comparative Example 12 | 0% | 0 | 15.9 | Absent | Present | Present | B | — | 9% | B |
| Comparative Example 13 | 0% | 0 | 17.7 | Absent | Present | Present | B | — | 9% | B |
| Comparative Example 14 | 0% | 0 | 26.6 | Absent | Present | Present | B | — | 10% | B |
| Comparative Example 15 | 0% | 0 | 35.4 | Absent | Present | Present | B | — | 12% | B |
| Comparative Example 16 | 0% | 0 | 44.3 | Absent | Present | Present | B | — | 12% | B |
| Comparative Example 17 | 36% | 0.02 | 0.0 | Present | Absent | Absent | VG | B | 4% | VG |
| Comparative Example 18 | 36% | 0.05 | 0.0 | Present | Absent | Absent | GG | B | 3% | GG |
| Comparative Example 19 | 36% | 0.1 | 0.0 | Present | Absent | Absent | GG | B | 2% | GG |
| Comparative Example 20 | 36% | 0.3 | 0.0 | Present | Absent | Absent | GG | B | 2% | GG |

TABLE 7-2

| | Upper layer | | Lower Layer | Plating Configuration | | Evaluation Results | | Sliding ability | |
|---|---|---|---|---|---|---|---|---|---|
| | W concentration Mass % | Thickness μm | Ni content g/m² | Ni—W alloy plating layer Present/Absent | Recrystallized Ni layer Present/Absent | Fe—Ni diffusion alloy layer Present/Absent | Continuous stamping property | Corrosion resistance | 2μ increase rate | Evaluation |
| Comparative Example 21 | 36% | 0.7 | 0.0 | Present | Absent | Absent | GG | B | 2% | GG |
| Comparative Example 22 | 36% | 1 | 0.0 | Present | Absent | Absent | GG | B | 2% | GG |
| Comparative Example 23 | 36% | 1.5 | 0.0 | Present | Absent | Absent | GG | B | 2% | GG |
| Comparative Example 24 | 36% | 1.8 | 0.0 | Present | Absent | Absent | GG | B | 2% | GG |
| Comparative Example 25 | 13% | 1.8 | 0.0 | Present | Absent | Absent | G | B | 6% | G |
| Comparative Example 26 | 19% | 1.8 | 0.0 | Present | Absent | Absent | VG | B | 4% | VG |
| Comparative Example 27 | 25% | 1.8 | 0.0 | Present | Absent | Absent | VG | B | 4% | VG |
| Comparative Example 28 | 30% | 1.8 | 0.0 | Present | Absent | Absent | VG | B | 4% | VG |
| Comparative Example 29 | 31% | 1.8 | 0.0 | Present | Absent | Absent | GG | B | 1% | GG |
| Comparative Example 30 | 32% | 1.8 | 0.0 | Present | Absent | Absent | GG | B | 1% | GG |
| Comparative Example 31 | 43% | 1.8 | 0.0 | Present | Absent | Absent | GG | B | 1% | GG |
| Comparative Example 32 | 54% | 1.8 | 0.0 | Present | Absent | Absent | GG | B | 1% | GG |
| Comparative Example 33 | 0% | 0 | 15.9 | Absent | Present | Present | B | — | 9% | B |
| Comparative Example 34 | 36% | 0.3 | 0.0 | Present | Absent | Absent | GG | B | 1% | GG |
| Comparative Example 35 | 36% | 1.8 | 0.0 | Present | Absent | Absent | GG | B | 1% | GG |
| Comparative Example 36 | 0% | 0 | 15.9 | Absent | Present | Present | B | — | 9% | B |
| Comparative Example 37 | 36% | 0.3 | 0.0 | Present | Absent | Absent | GG | B | 1% | GG |
| Comparative Example 38 | 36% | 1.8 | 0.0 | Present | Absent | Absent | GG | B | 1% | GG |

The invention claimed is:

1. A Ni-containing-surface-treated steel sheet for a can which is formed by a stamping, the Ni-containing-surface-treated steel sheet comprising:
    a steel sheet having a first surface which becomes an outer side of the can after the stamping;
    a Ni containing layer arranged on the first surface of the steel sheet; and
    a Ni—W alloy plating layer arranged on the Ni containing layer,
    wherein the Ni containing layer has a Fe—Ni diffusion alloy layer,
    a Ni content included in the Ni containing layer is 5 g/m² to 89 g/m²,
    a thickness of the Ni—W alloy plating layer is 0.02 μm to 2 μm, and
    a W concentration in the Ni—W alloy plating layer is 31% to 65% by mass %.

2. The Ni-containing-surface-treated steel sheet for a can according to claim 1,
    wherein the Ni containing layer further has a recrystallized Ni layer, and
    the recrystallized Ni layer is arranged between the Fe—Ni diffusion alloy layer and the Ni—W alloy plating layer.

3. The Ni-containing-surface-treated steel sheet for a can according to claim 1,
    wherein the thickness of the Ni—W alloy plating layer is 0.05 μm to 1 μm, and
    the W concentration in the Ni—W alloy plating layer is 31% to 60% by mass %.

4. The Ni-containing-surface-treated steel sheet for a can according to claim 3,
    wherein the W concentration in the Ni—W alloy plating layer is 31% to 55% by mass %.

5. The Ni-containing-surface-treated steel sheet for the can according to claim 1,
    wherein the Ni content included in the Ni containing layer is 7 g/m² to 40 g/m².

6. A can formed by a Ni-containing-surface-treated steel sheet for a can according to claim 1.

7. A method of manufacturing a Ni-containing-surface-treated steel sheet for a can according to claim 1, the method comprising:
    a Ni plating process of performing Ni plating on the first surface side of the steel sheet;
    a Ni—W alloy plating process of performing Ni—W alloy plating on the first surface side of the steel sheet; and
    a heating process of performing heating of the steel sheet in a temperature range of 600° C. to 950° C. for 5 seconds to 60 minutes after the Ni plating process or after the Ni—W alloy plating process.

8. The method of manufacturing a Ni-containing-surface-treated steel sheet for a can according to claim 7,
    wherein the heating process is performed after the Ni plating process, and
    wherein the method further comprises a film removing process of removing an oxide layer on a surface of the first surface side of the steel sheet after the heating process and before the Ni—W alloy plating process.

9. The method of manufacturing a Ni-containing-surface-treated steel sheet for a can according to claim 7,
wherein the heating process is performed after the Ni—W alloy plating process, and
the first surface side of the steel sheet is kept so as not to be oxidized between the Ni plating process and the Ni—W alloy plating process.

10. The method of manufacturing a Ni-containing-surface-treated steel sheet for a can according to claim 7,
wherein the steel sheet which is used in the Ni plating process is manufactured by a cold rolling, and not annealed after the cold rolling.

11. The Ni-containing-surface-treated steel sheet for a can according to claim 2,
wherein the thickness of the Ni—W alloy plating layer is 0.05 μm to 1 μm, and
the W concentration in the Ni—W alloy plating layer is 31% to 60% by mass %.

12. The Ni-containing-surface-treated steel sheet for the can according to claim 2,
wherein the Ni content included in the Ni containing layer is 7 g/m$^2$ to 40 g/m$^2$.

13. A can formed by a Ni-containing-surface-treated steel sheet for a can according to claim 2.

14. A method of manufacturing a Ni-containing-surface-treated steel sheet for a can according to claim 2, the method comprising:
a Ni plating process of performing Ni plating on the first surface side of the steel sheet;
a Ni—W alloy plating process of performing Ni—W alloy plating on the first surface side of the steel sheet; and
a heating process of performing heating of the steel sheet in a temperature range of 600° C. to 950° C. for 5 seconds to 60 minutes after the Ni plating process or after the Ni—W alloy plating process.

* * * * *